United States Patent
Ogawa

(10) Patent No.: US 7,791,296 B2
(45) Date of Patent: Sep. 7, 2010

(54) MOTOR PROTECTION SYSTEM

(75) Inventor: Sumitaka Ogawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 441 days.

(21) Appl. No.: 11/878,280

(22) Filed: Jul. 23, 2007

(65) Prior Publication Data

US 2008/0024080 A1    Jan. 31, 2008

(30) Foreign Application Priority Data

Jul. 26, 2006  (JP) .............................. 2006-203151
Aug. 25, 2006  (JP) .............................. 2006-229150

(51) Int. Cl.
*H02H 7/08* (2006.01)
*B62D 5/04* (2006.01)

(52) U.S. Cl. ...................... 318/434; 318/473; 388/934; 361/24

(58) Field of Classification Search ......... 318/432–434, 318/471–473; 388/934; 361/23–34
See application file for complete search history.

(56) References Cited

U.S. PATENT DOCUMENTS

| | | | | |
|---|---|---|---|---|
| 4,301,396 A | * | 11/1981 | Bourke | 318/490 |
| 4,394,607 A | * | 7/1983 | Lemirande | 318/453 |
| 4,430,681 A | * | 2/1984 | Benzing | 361/27 |
| 5,936,820 A | * | 8/1999 | Umemura et al. | 361/103 |
| 7,091,686 B2 | * | 8/2006 | Kagei | 318/434 |

FOREIGN PATENT DOCUMENTS

JP   2005-324796 A   11/2005

* cited by examiner

*Primary Examiner*—Bentsu Ro
(74) *Attorney, Agent, or Firm*—Birch, Stewart, Kolasch & Birch LLP

(57) ABSTRACT

To precisely detect the temperature of a power assist motor without using a temperature sensor and enhance an overheating protection function. A calorific value calculating unit calculates a calorific value based upon the difference between a calorific value by current supplied to a motor and the quantity of heat radiation. The output of the calorific value calculating unit is accumulated and an accumulated value is input to an accumulated value buffer. A cumulative value TS acquired by adding initial temperature T0 to a cumulative value Td is input to a ratio map of a target current value, ratio is read, and a target base current value is limited according to the ratio. The cumulative value TS used in the map is not an actual motor current value and is calculated based upon unlimited current acquired in an unlimited current calculating unit.

14 Claims, 18 Drawing Sheets

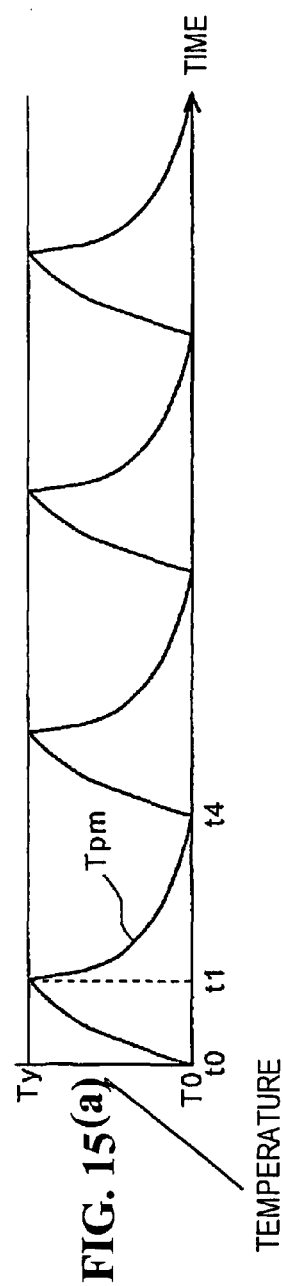
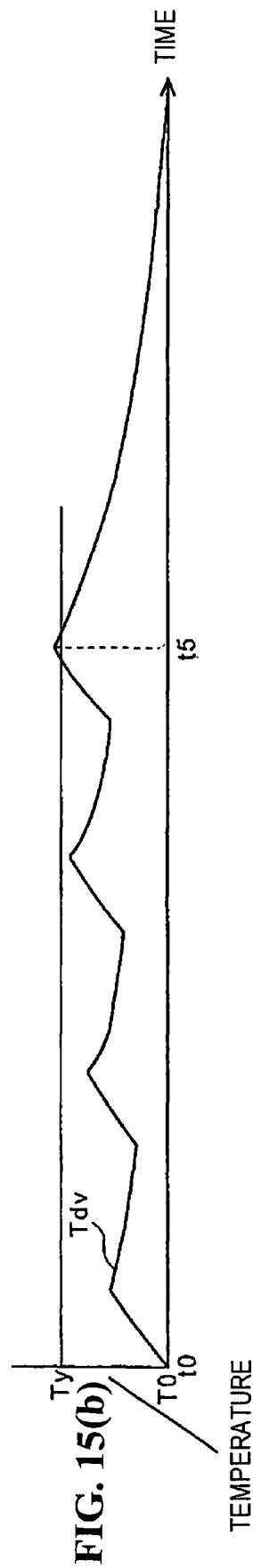
FIG. 15(a)
FIG. 15(b)

MOTOR PROTECTION SYSTEM

CROSS-REFERENCE TO RELATED APPLICATIONS

The present application claims priority under 35 USC 119 to Japanese Patent Application Nos. 2006-203151 filed on Jul. 26, 2006 and 2006-229150 Aug. 25, 2006 the entire contents of which are hereby incorporated by reference.

BACKGROUND OF THE INVENTION

1. Field of the Invention

The present invention relates to motor protection systems. More particularly to a motor protection system for protecting a motor used for electric power steering for example by a motor overheating prevention function. In addition, the present invention relates to overheating prevention systems. More particularly, to a system that estimates the temperature of a motor and a motor peripheral device, limits current according to estimated temperature and protects the motor and the motor peripheral device from overheating.

2. Description of Background Art

An electric power steering system is known that applies a turning assist force by an electric motor to a steering shaft so as to facilitate steering when the steering shaft is turned and a vehicle is steered.

In JP-A No. 2005-324796, a control unit is described that estimates the temperature of a coil of a motor and executes a motor temperature protection control based upon the estimated temperature so as to prevent the overheating of the electric motor of an electric power steering system.

Generally, when the temperature of a coil of a motor is estimated, a value of current flowing in the coil and a resistance value of the coil are utilized according to Joule's law. More specifically, when the current value is I, the resistance value is R and energizing time is t, a calorific value Q can be estimated by an Expression 1 ($Q = I \times I \times R \times t$).

The calorific value is estimated by this expression 1, however, to further estimate the temperature, the quantity of heat radiation is also required to be considered. The following expression 2 is an expression for estimating a calorie including a constant "a" as a term for correcting the quantity of heat radiation. A cumulative value T represents the temperature.

Cumulative value $T = \Sigma(K \times I \times I - a)$—(Expression 2). This Expression 2 is an expression for accumulating a calorific value when power steering is operated and electricity is supplied to the electric motor by energizing time and estimating the temperature and the constant "a" is subtracted as the quantity of heat radiation. The constant "a" in the Expression 2 is set to an extremely small value so that a cumulative value is zeroed in a longer period of time than the period of time until the temperature is restored to ordinary temperature from maximum temperature of the coil when the supply of electricity is stopped so as to estimate the temperature slightly higher and to secure temperature protection. The reason is that when the constant "a" is too large, the cumulative value T becomes small and the temperature of the coil is apt to be estimated lower. When no electricity is supplied for a long period of time, the cumulative value T is returned to zero because of the constant "a." In the Expression 2, a coefficient K is an accumulating coefficient and is a numeric value acquired by an experiment beforehand so that a calculated value approximates to a measured value.

The temperature of the electric motor can be estimated using the Expression 2 without using a temperature sensor and the electric motor is protected by stopping the supply of current to the electric motor when estimated temperature is equal to or exceeds preset temperature.

The above-mentioned Expression 2 is suitable for a vehicle that dedicatedly runs on a maintained general road, however, it is not necessarily suitable for an all terrain vehicle (ATV) that runs off road and on other terrain. In off-road driving, as a steering angle is large, steering is frequent and the energization of the electric motor is frequent, the cumulative value T is excessive, the supply of current to the electric motor is stopped at low temperature at which protection from generated heat is actually not required, and no assist force may be applied to the steering shaft.

The reason why the cumulative value T is excessive and is not mutually related to the actual temperature is as follows. The constant "a" for correction in consideration of the quantity of heat radiation is an extremely small fixed value, however, the actual quantity of heat radiation varies depending upon difference between the temperature of the electric motor and ambient temperature. As the difference in temperature increases in operation over a long period of time, the quantity of heat radiation increases and the actual temperature of the electric motor hardly rises relatively. Therefore, according to the Expression 2 in which the constant "a" is the extremely small fixed value, a cumulative value of calorific values has a tendency to increase and it is conceivable that the correlation between the cumulative value T and the actual temperature cannot be maintained.

However, as the electric power steering system includes heating components by energization containing the motor (the coil and a brush of the motor) and a peripheral device such as a motor controller that controls the motor (more particularly, an electronic component such as FET), all these are objects for overheating protection. When plural elements or components (hereinafter merely called components) are all objects for overheating protection, heat gain/loss characteristics for every component are required to be considered. As heat capacity is different for every component, a certain component soon generates heat and soon radiates heat, another component slowly generates heat, and slowly radiates heat.

Then, when the heat gain/loss characteristics depending upon the difference in heat capacity are considered, estimated temperature is required to be determined so that the estimated temperature is not lower than the actual temperature of all components, that is, so that the estimated temperature rises sooner than the rise of the temperature of all components in generating heat and goes down more slowly than the decline of the temperature of all components in radiating heat.

However, when the heat capacity of each component is different, it is difficult to suitably estimate the temperature, for example, a component is estimated to be slightly overheated and a protection measure such as the limitation of current is sometimes taken soon. Then, though the temperature of the component actually goes down, a protective device is released and it is sometimes delayed to be restored to normal operation. In addition, as not only heat capacity but heat resistant temperature are different for every component, the temperature of plural components cannot be easily estimated by only one arithmetic expression.

SUMMARY AND OBJECTS OF THE INVENTION

The object of the invention is to provide a motor protection system in which the temperature of an electric motor is precisely estimated and the overheating of the motor can be prevented in a power steering system used under a driving condition wherein the power steering system is frequently operated and during other driving conditions.

According to an embodiment of the present invention, a current value correcting unit is provided for correcting an upper limit value of limited current supplied to the motor to be a larger value in the motor protection system provided with the motor together with a motor driver for controlling current supplied to the motor. A temperature estimating unit estimates the temperature of the motor based upon the current supplied to the motor. An overheating prevention unit limits the upper limit value of the current supplied to the motor according to estimated temperature of the motor. When the current upper limit value is limited by the overheating prevention unit, the temperature estimating unit estimating the temperature of the motor using the corrected upper limit value of the current supplied to the motor.

In addition, according to an embodiment of the present invention the overheating prevention unit is configured so that the upper limit value of the current supplied to the motor is limited at a current limiting ratio according to the motor temperature when the motor temperature estimated by the temperature estimating unit rises to a predetermined value and the current value correcting unit corrects the upper limit value according to the current limiting ratio to be a larger value.

Further, according to an embodiment of the present invention the current value correcting unit corrects so that the upper limit value becomes large as the current limiting ratio decreases. In addition, the current limiting ratio is reset to be 1.0 when the current limiting ratio decreases up to a preset value in the vicinity of zero.

In addition, according to an embodiment of the present invention the temperature estimating unit is provided with a calorific value accumulating unit that accumulates the difference between a calorific value of the motor by supplied current and the quantity of heat radiation according to time series and the quantity of heat radiation is a function of difference between a calorific value accumulated value calculated by the calorific value accumulating unit and ambient temperature.

Further, according to an embodiment of the present invention the calorific value is calculated based upon a value acquired by multiplying the motor supplied current value and a predetermined heat gain coefficient, the quantity of heat radiation is calculated based upon a value acquired by multiplying the difference between the calorific value accumulated value and ambient temperature and a predetermined heat loss coefficient, and the heat gain coefficient and the heat loss coefficient are set so that the calorific value accumulated value is larger than the temperature measured beforehand of the motor.

Furthermore, according to an embodiment of the present invention the invention is utilized for preventing the overheating of the motor for an electric power steering system.

The temperature of the motor is estimated based upon current supplied to the motor. When current is limited while the temperature of the motor rises, the temperature of the motor is estimated to be a smaller value according to a limited current value as a result. Therefore, the current value and estimated temperature are balanced at a certain point. Then, in the first characteristic, when the temperature of the motor is estimated, the limited current value is corrected to be a slightly larger value so as to prevent the estimated temperature from being estimated to be a smaller value according to the limited current value even if current is limited. Hereby, a situation wherein current is limited in an equilibrium condition in which current does not go down enough is avoided.

According to embodiments of the present invention, the current limiting ratio is used to limit current of the motor and a current value for estimating temperature is determined as a function of the current limiting ratio. Therefore, when the current limiting ratio is equal to or smaller than 1.0 and current is limited, the current value for estimating temperature is automatically corrected.

According to an embodiment of the present invention, a current value is prevented from being a function of zero and a problem that estimated temperature rises though current is sufficiently reduced can be avoided.

According to an embodiment of the present invention, as the quantity of heat radiation is calculated based upon the difference between a calorific value and ambient temperature without being a fixed value, the temperature of the motor can be more precisely estimated in a situation that the motor is frequently started and stopped.

According to an embodiment of the present invention, as the heat gain coefficient and the heat loss coefficient respectively are set so that the estimated temperature is higher than a measured temperature of the motor are used, the estimated temperature of the motor is calculated to be slightly higher. Therefore, even if a load of the motor increases, current supplied to the motor is limited before the overheating of the motor.

According to an embodiment of the present invention, the temperature of the motor for the power steering system is more precisely estimated in the driving condition in which power steering is frequently operated and the motor can be protected from overheat.

An object of an embodiment of the present invention is to provide an overheating prevention system that determines estimated temperature suitable for protecting plural components from overheating.

An object of an embodiment of the present invention is based upon an overheating prevention system including a motor and a motor controller that controls current supplied to the motor within a predetermined upper limit value. The overheating prevention system is provided with a first temperature calculating unit that calculates estimated temperature of the motor based upon current supplied to the motor. A second temperature calculating unit is provided that calculates estimated temperature of the motor controller based upon the current supplied to the motor. A first current value calculating unit is provided that determines an upper limit value of the current supplied to the motor according to the estimated temperature of the motor. A second current value calculating unit is provided that determines an upper limit value of the current supplied to the motor according to the estimated temperature of the motor controller. A selecting unit selects either of the upper limit values of current calculated in the first current value calculating unit and the second current value calculating unit based upon a preset criterion.

In addition, according to an embodiment of the present invention, the selecting unit selects a smaller one of the upper limit values of current calculated in the first current value calculating unit and the second current value calculating unit.

Further, according to an embodiment of the present invention, the first temperature calculating unit and the second temperature calculating unit calculate estimated temperature using the following expression and at least a heat gain coefficient Kup and a heat loss coefficient Kdn out of coefficients in the expression are individually set for the motor and for the motor controller. The arithmetic expression is as follows.

Estimated temperature=Σ((heat gain coefficient Kup×motor current I×I)−(heat loss coefficient Kdn×(last accumulated temperature Td−ambient temperature Tm))+initial temperature T0.

According to an embodiment of the present invention, a heat gain coefficient Kup and a heat loss coefficient Kdn, respectively, of either requiring larger heat capacity are set so that both coefficients are smaller than a heat gain coefficient Kup and a heat loss coefficient Kdn respectively of the other requiring smaller heat capacity according to respective heat capacity of the motor and the motor controller.

According to an embodiment of the present invention, the heat gain coefficient Kup and the heat loss coefficient Kdn are determined based upon the heat capacity of a brush for supplying current to the motor in the motor as to the motor and the heat capacity of a motor current switching device in the motor controller as to the motor controller.

According to an embodiment of the present invention, the motor is a motor for a power steering system that applies steering assist force according to torque which operates on a steering shaft to the steering shaft and the motor controller is configured so that it varies current supplied to the motor according to the amplitude of the torque and controls the steering assist force.

According to an embodiment of the present invention, as the estimated temperature and the upper limit value of current according to the estimated temperature are individually calculated as to the motor and the motor controller, suitable current limitation according to temperature characteristics of the motor and the motor controller is enabled.

More particularly, according to an embodiment of the present invention, as a smaller one of the calculated upper limit values of current is selected and the current supplied to the motor is controlled, control is made using either one of which is less likely to be overheated as a criterion and the devices can be securely protected from overheating.

According to an embodiment of the present invention, as the temperature can be estimated in consideration of the heat gain coefficient and the heat loss coefficient, at least the heat gain coefficient and the heat loss coefficient are separately set as to the motor and the motor controller and the arithmetic expression itself can be common, the configurations are simple.

In addition, according to an embodiment of the present invention, suitable overheating protection in consideration of heat generation and heat radiation is enabled depending upon a difference in heat capacity.

Further, according to an embodiment of the present invention, as the heat gain coefficient and the heat loss coefficient are set using the component that requires smaller heat capacity, compared with that of another component and is easily overheated as a criterion out of components of the motor and the motor controller, overheating protection can be securely made.

Furthermore, according to an embodiment of the present invention, in a driving condition in which power steering is frequently operated, the temperature of the motor for the power steering system is more precisely estimated and the motor can be protected from overheating.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 15(a) and 15(b) show heat gain/heat loss characteristics of the components when the components are intermittently energized;

DETAILED DESCRIPTION OF THE PREFERRED EMBODIMENTS

Figure 2:
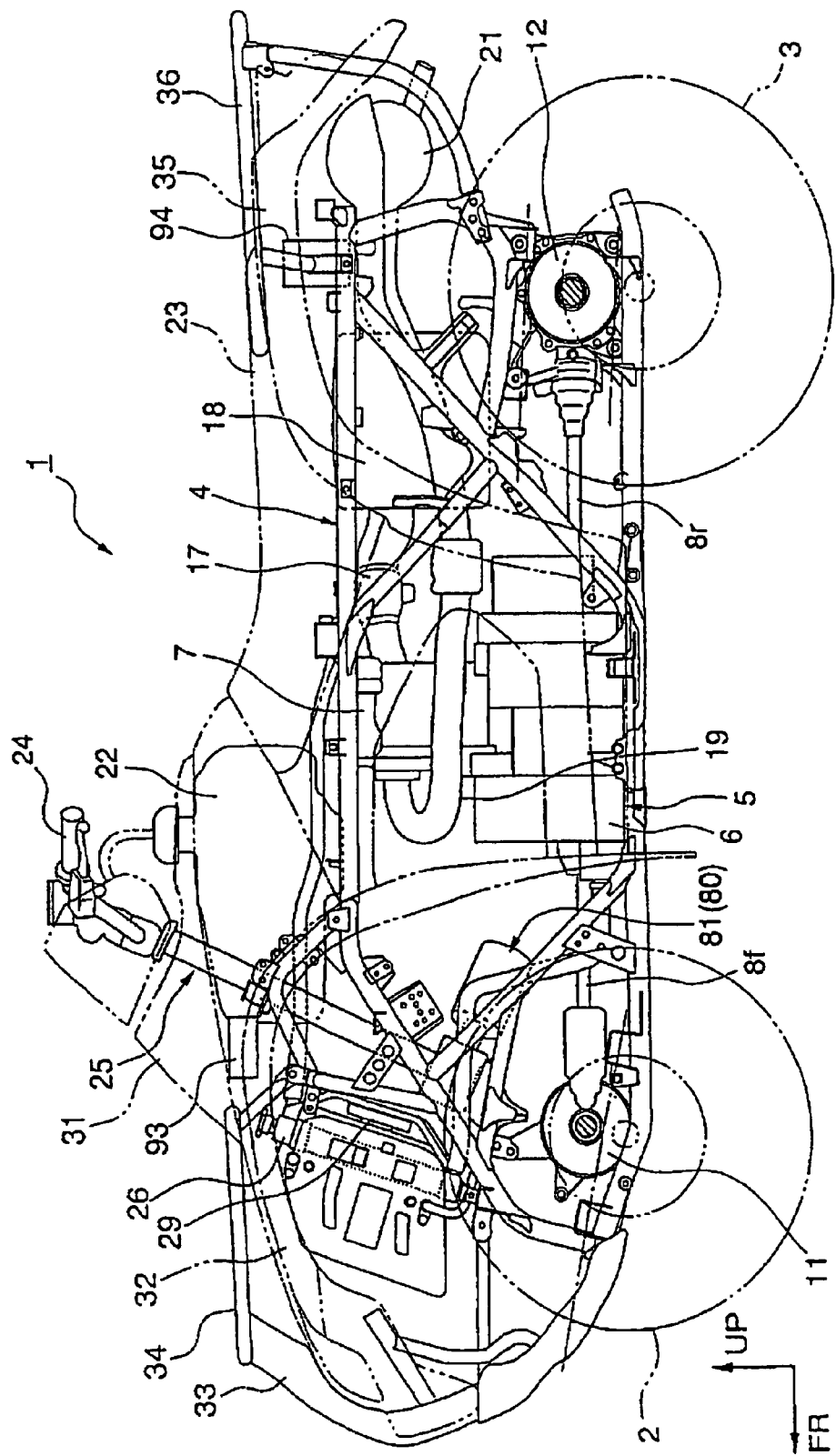
FIG. 2 is a left side view showing a saddle-ride type vehicle in which the control unit for electric power steering according to the invention is mounted.

Referring to the drawings, one embodiment of the invention will be described below. FIG. 2 is a left side view showing a saddle-ride type vehicle in which a control unit for electric power steering equivalent to one embodiment of the invention is built. The saddle-ride type vehicle (hereinafter merely called the vehicle) 1 is provided with right and left front wheels 2 and back wheels 3 which are low pressure balloon tires having a relatively large diameter in a longitudinal direction of a compact and light body. Vehicle 1 is an all terrain vehicle (ATV) that is capable of driving on an uneven road.

An engine 5 as a power plant is mounted in the center of a body frame 4. The engine 5 is a water-cooled single-cylinder engine and is laid out so that its output shaft is located in a longitudinal direction of the vehicle 1. A transmission shaft 8*f* protruded forward from a lower part of the engine 5 and is connected to the front wheel 2 via a front speed reducing mechanism 11 on the downside of the front of the body frame 4 so that power can be transmitted. Similarly, a transmission shaft 8*r* is connected to the rear wheel 3 via a rear speed reducing mechanism 12 on the downside of the rear of the body frame 4 so that power can be transmitted.

In the engine 5, a throttle body 17 is connected to the rear of a cylinder block 7 planted on a crankcase 6 and an air cleaner 18 is connected to the rear of the throttle body 17. An exhaust pipe 19 is connected to the cylinder block 7 and an end of the exhaust pipe 19 is connected to a muffler 21 in the rear of the body.

A fuel tank 22 is provided to the front of the center in a direction of the width of the body on the upside of the body of the vehicle 1 and a seat 23 is arranged at the back of the fuel tank 22. A battery 94 is arranged on the downside of the rear of the seat 23. In the front of the fuel tank 22, a concave portion is formed so that a steering shaft 25 can be vertically extended and a steering handlebar (hereinafter merely called a handlebar) 24 is fixed to an upper end of the steering shaft 25. A radiator 26 for cooling the engine is arranged in front of a lower part of the steering shaft 25 and a radiator fan 29 is provided rearwardly of the radiator 26.

A body cover 31 is provided that covers the front of the body with a front fender 32 that covers the upside of the front wheel 2. A front protector 33 and a front carrier 34 are attached to the front of the body frame 4. A rear fender 35 that covers the upside of the rear wheel 3 and a rear carrier 36 are attached to the rear of the body frame 4.

Figure 3:
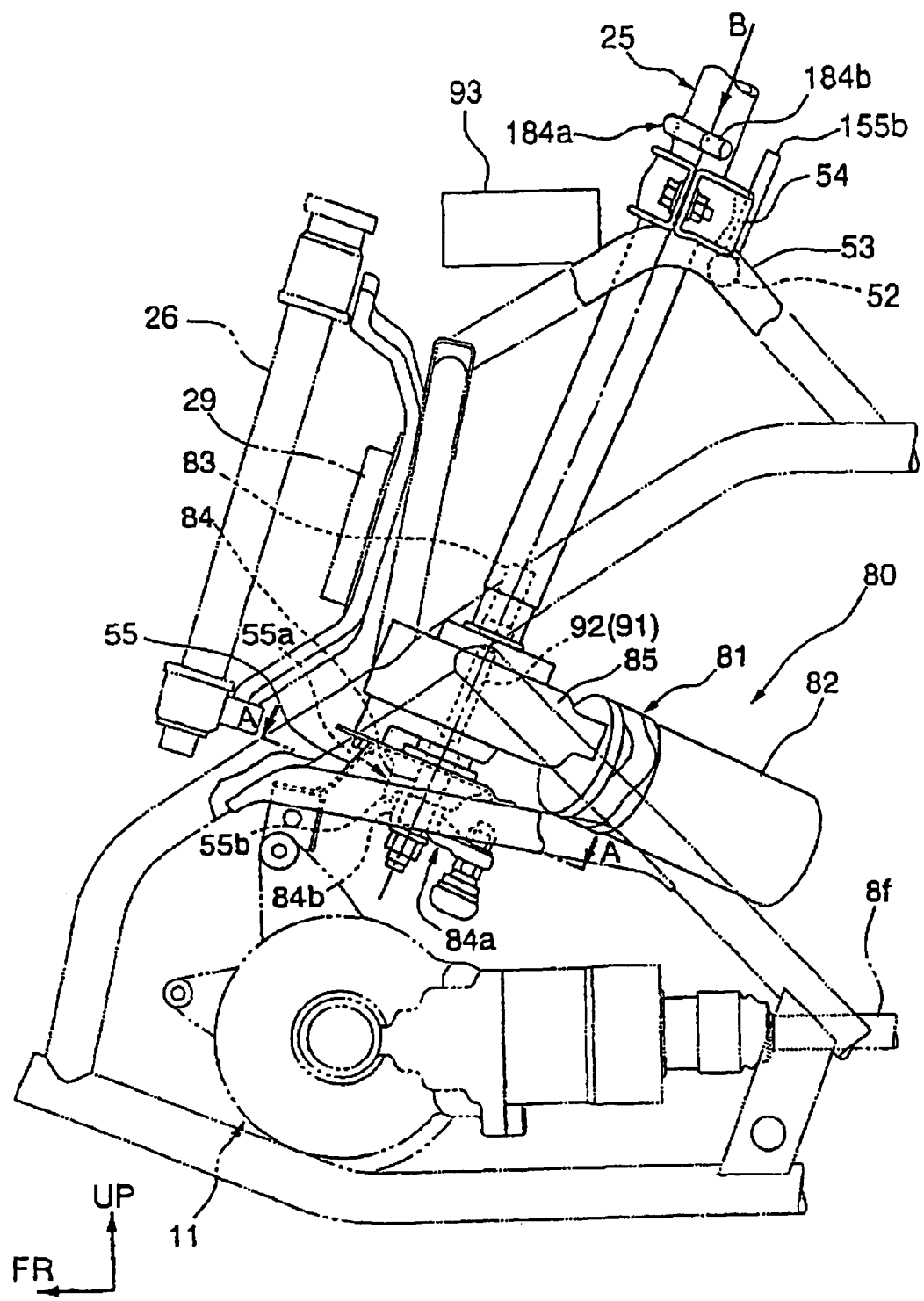
FIG. 3 is an enlarged side view showing a main part in FIG. 2.

Also referring to FIG. 3 together with FIG. 2, an electric power steering system will be described below. FIG. 3 is an enlarged side view showing the electric power steering system which is a main part in FIG. 2. An upper part and the lower part of the steering shaft 25 are supported by an upper part supporting bracket 54 bonded to the body frame 4 and a lower part supporting bracket 55. The electric power steering system 80 is configured by an actuator unit 81 provided to an intermediate part of the steering shaft 25 and a control unit 93 as ECU that drives and controls a power assist motor 82 integrated with the actuator unit 81. The power assist motor 82 is driven and controlled based upon a value sensed by a torque sensor 91 as a torque sensing means provided in the actuator unit 81.

The lower end of the steering shaft 25 is coaxially coupled to an input shaft 83 of the actuator unit 81 and its output shaft 84 coaxial with these shafts is supported by the lower part supporting bracket 55 via a bearing 55*a*. The input shaft 83 and the output shaft 84 are mutually connected in a housing 85 of the actuator unit 81 via a torsion bar 92 which is a part of the torque sensor 91.

As grounding resistance acts on the front wheel 2, relative torque is generated between the input shaft 83 mechanically coupled to the handlebar 24 and the output shaft 84 mechanically coupled to the front wheel 2 when the handlebar 24 is turned rightward or leftward. As a result, as the torsion bar 92 is twisted, the steering wheel torque of the handlebar 24 can be detected based upon the twist quantity. A detected value of the steering wheel torque is input to the control unit 93 and the power assist motor 82 is driven and controlled according to the detected value.

As turning assist force from the power assist motor 82 is applied to a steering mechanism including the steering shaft 25 (the output shaft 84) in addition to a control force from the handlebar 24 when the handlebar 24 is turned, an amount in which the handlebar 24 is turned is relatively reduced.

Figure 4:
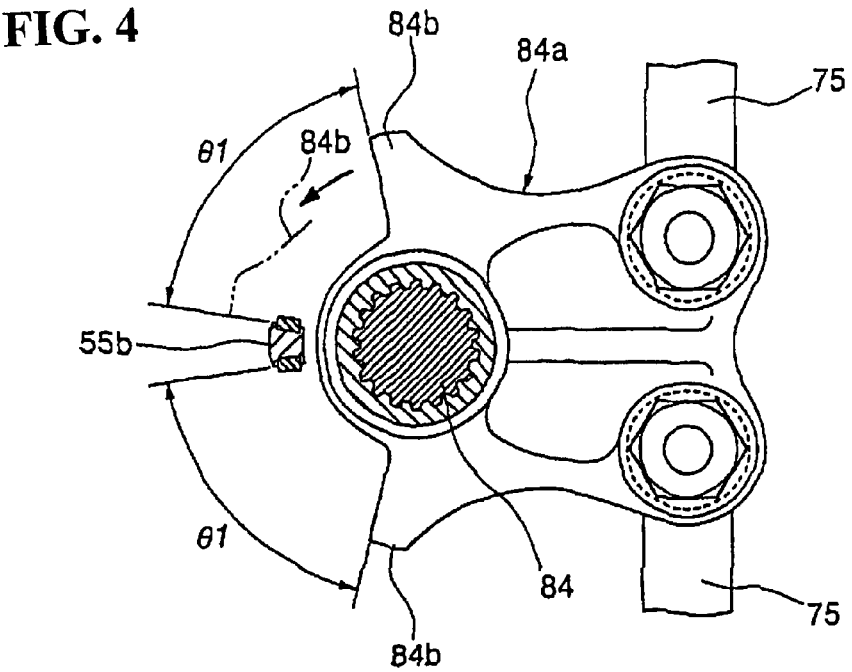
FIG. 4 is a sectional view viewed along a line A-A in FIG. 3.

FIG. 4 is an enlarged sectional view showing the circumference of the output shaft 84. As shown in FIG. 4, a pair of right and left tie rods 75 is extended in the direction of the width of the body of the vehicle 1 and are coupled to the right and left front wheels 2. Ends (ends on the reverse sides to the sides on which the front wheels 2 are coupled) of these tie rods 75 are coupled to pitman arms 84*a* in the center in the direction of the width of the body. The pitman arm 84*a* is fitted to the output shaft 84 via a spline.

The pitman arm 84*a* is located immediately under the lower part supporting bracket 55, and the pitman arm 84*a* and the bearing 55*a* form a handlebar stopper that prescribes a right-handed or left-handed maximum steered position of the steering shaft 25, that is, the handlebar 24. More specifically, a body 55*b* of the stopper abuts on the downside of the bearing 55*a*, contact portions 84*b* are formed in the front of the right and left pitman arms 84*a*, and when the handlebar 24 is turned by a predetermined angle θ1 rightward or leftward from a condition in which a steering angle is 0 degree, that is, the vehicle directly advances, the contact portion 84*b* abuts on the side of the body 55*b* of the stopper to be a maximum steered condition in which the further operation of the handlebar is regulated. A maximum steering switch 10 as maximum steering detecting means is respectively provided to the sides of the body 55*b* of the stopper.

Figure 5:
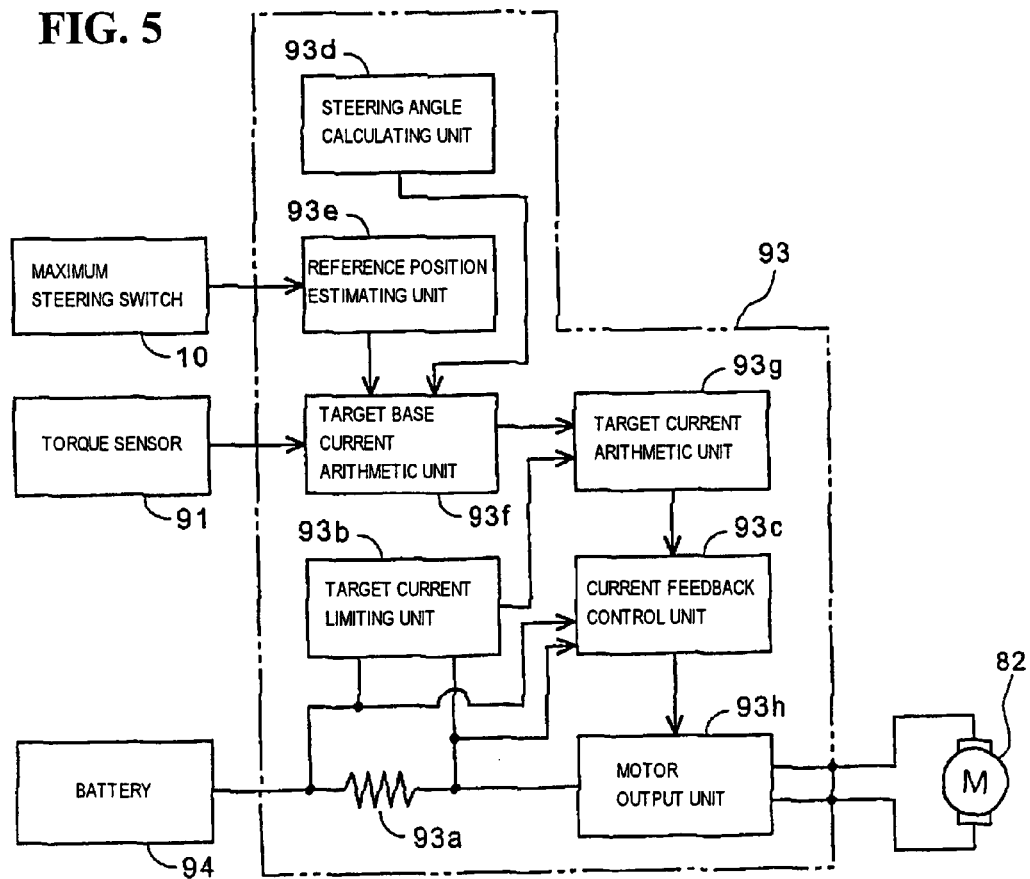
FIG. 5 is a block diagram showing facilities of a main part of the control unit for electric power steering.

FIG. 5 is a block diagram showing facilities of a main part of the control unit for electric power steering. The control unit 93 detects a steering angle of the steering shaft 25 based upon a maximum steering detection signal input from the maximum steering switch 10 and values of voltage and current supplied to the power assist motor 82 and controls steering assist force to the steering shaft 25 based upon the detected steering angle.

The control unit 93 is provided with a steering angle calculating unit 93*d* that calculates a relative steering angle (a steering angle from an arbitrary position) of the steering shaft 25 and a reference position estimating unit 93*e* that estimates a steering reference position (a steering reference condition for the body) of the steering shaft 25 based upon the maximum steering detection signal.

A target base current arithmetic unit 93*f* calculates a target base current value that is a motor current value on which the steering assist force is founded based upon torque sensed by the torque sensor 91 and an absolute steering angle (a relative steering angle from the steering reference position) of the steering shaft 25 which can be known from the relative steering angle and the steering reference position. It is desirable that vehicle speed is added to parameters to determine the target base current value.

A target current arithmetic unit 93*g* determines a target current value by applying inertia correction and damping correction to the target base current value. In the inertia correction, a target current value is corrected using a variation of torque as a parameter. Weight felt by a rider via the handlebar 24 when steering is started is improved in consideration of motor inertia and a steering feeling can be enhanced. In the damping correction, the target current value is corrected using the number of revolutions of the power assist motor 82 as a parameter. Correction values are set so that the target current value becomes smaller as the number of revolutions increases. The resistance of the handlebar 24 is optimized and a steering feeling can be enhanced.

A current sensor 93a that senses current supplied to the power assist motor 82 is provided and a sensed current value is input to a target current limiting unit 93b and a current feedback control unit 93c.

The target current value of the power assist motor 82 is limited to a target current upper limit value in the target current limiting unit 93b for overheating protection. The target current limiting unit 93b calculates the temperature of the power assist motor 82 based upon current supplied to the power assist motor 82 in an arithmetic expression described later and determines the target current upper limit value according to the temperature.

Current from the battery 94 is supplied to the power assist motor 82 via a motor output unit 93h, that is, a motor driver. The motor output unit 93h is an FET bridge circuit and varies a value of current supplied to the power assist motor 82 in response to an input on-duty instructed value. The current feedback control unit 93c determines a duty instructed value so that the current value sensed by the current sensor 93a converges on the target current value and inputs it to the motor output unit 93h.

As described above, as the power assist motor 82 is driven and controlled based upon not only a steering torque detection signal from the torque sensor 91 but the absolute steering angle of the steering shaft 25, fine control such as steering assist force can be varied between a case wherein the handlebar 24 is turned from a position in which the vehicle directly advances and a case wherein the handlebar 24 is returned to the position in which the vehicle directly advances is enabled. An upper limit value of current supplied to the power assist motor 82 is determined according to estimated temperature of the power assist motor 82, when the estimated temperature is equal to or higher than predetermined overheating protection temperature, steering assist force is reduced or zeroed, and the power assist motor 82 is protected from overheating.

A method of estimating the temperature of the power assist motor 82, which is executed by the target current limiting unit 93b, will be described in contrast with a method in the related art below.

The temperature of the power assist motor 82 is estimated based upon a cumulative value of difference between a calorific value and the quantity of heat radiation. As described in relation to the expression 2 in an item of the related art, the quantity of heat radiation was set to a constant "a" in the past and the radiation of heat of a fixed amount was set independent of whether electricity was supplied or not. As the constant "a" was an extremely small value, a cumulative value T corresponding to temperature had a tendency to continue to increase almost without decreasing in a driving condition in which the supply of electricity continued. Therefore, a target current value is limited in a short time and steering assist force was sometimes not generated.

Figure 6:
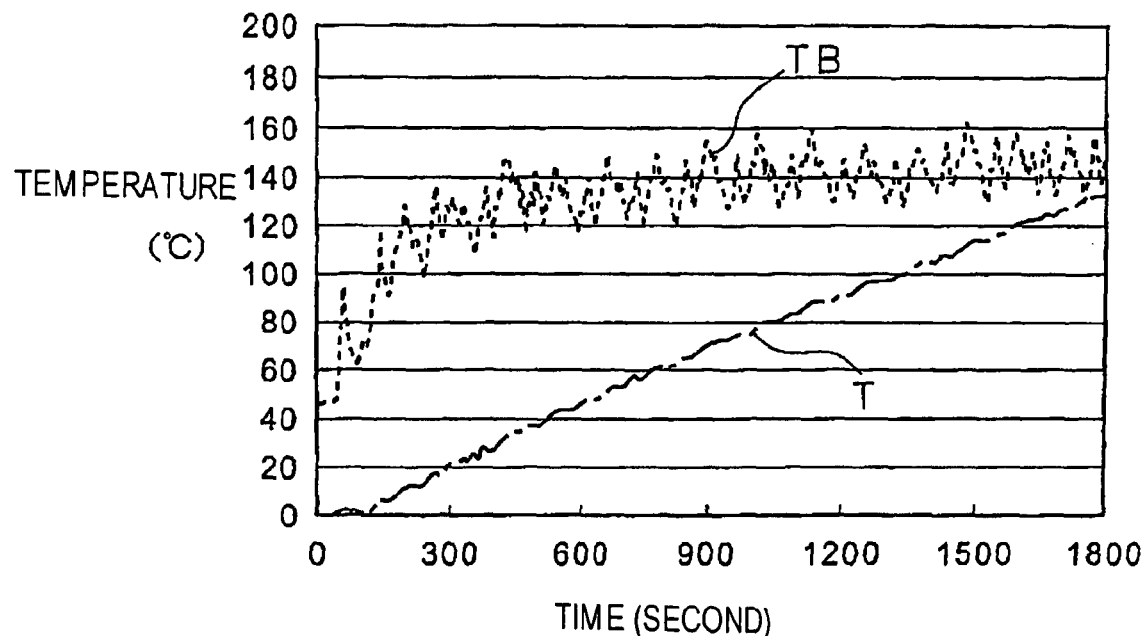
FIG. 6 shows a cumulative value T which is a result of motor temperature simulation on an off road driving condition and temperature TB measured at a brush of a power assist motor.

However, actually, in off-road driving in which operation for returning the handlebar 24 is frequent for example, the temperature is substantially balanced by the repetition of the generation of heat and heat radiation. FIG. 6 shows a cumulative value T calculated based upon the expression 2 on an off-road driving condition and temperature TB measured at a brush of the power assist motor 82. As shown in FIG. 6, the cumulative value T continues to increase, however, the measured temperature TB is balanced at approximately 140° C. When the cumulative value T continues to increase, the temperature represented by the cumulative value T exceeds the limit temperature of a target current value independent of a fact that the measured temperature TB is balanced, an upper limit of the target current value is limited, and the application of steering assist force is stopped.

Figure 7:
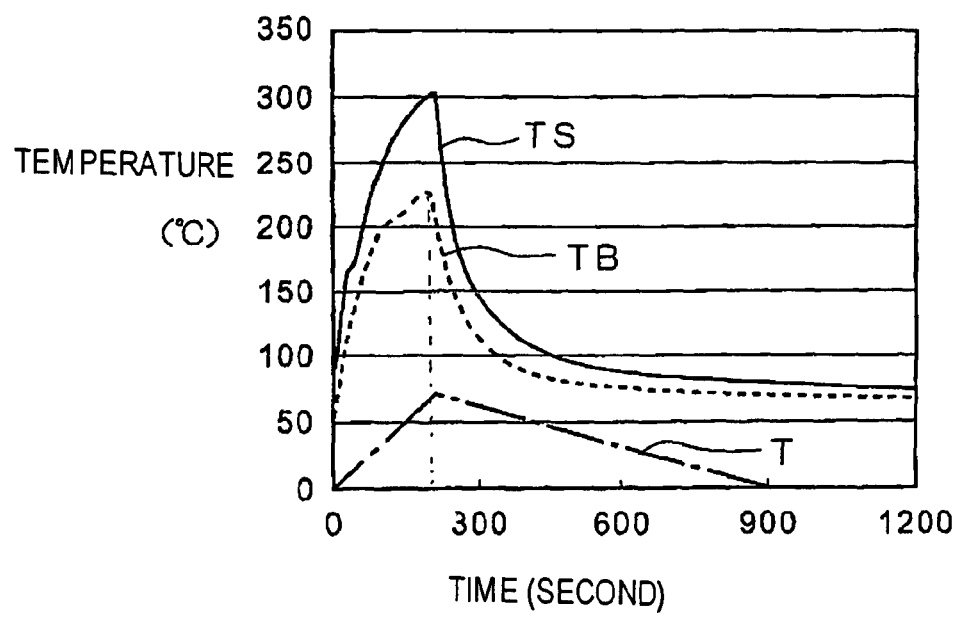
FIG. 7 shows variations of the temperature of the power assist motor in energizing and after energization is stopped.

Then, the modification of the expression 2 was discussed so that the actual temperature of the power assist motor 82 can be represented by a calculated value. First, the variations of the temperature of the power assist motor 82 when electricity is supplied and after the supply of electricity is stopped are shown in FIG. 7. As shown in FIG. 7, a line TB shows measured temperature TB of the power assist motor 82 and shows a result of measurement at the brush. A line T shows a cumulative value T based upon the expression 2 and a line TS shows a result of temperature simulation based upon a cumulative value TS based upon an expression described later acquired by modifying the expression 2. As shown by the line TB, the measured temperature TB rapidly rises to approximately 200° C. by the supply of electricity, a degree of the rise slightly becomes slow afterward, and shows a sign that the measured temperature becomes a balanced condition. When the supply of electricity is stopped after the supply of electricity for 200 seconds, heat is rapidly radiated and the temperature goes down. However, a degree in which the temperature goes down soon becomes slow and the temperature goes down along an asymptotic line for the temperature in starting.

In the meantime, in the result of the temperature simulation based upon the cumulative value T by the expression 2, the temperature linearly rises since the supply of electricity is started and when the supply of electricity is stopped, the temperature linearly goes down. As for the measured temperature TB, the speed of heat radiation varies according to the difference between the temperature of the power assist motor 82 and ambient temperature, while in the result of the simulation based upon the cumulative value T, it is considered that the temperature linearly goes down because the constant "a" merely reduced every calculation independent of the difference between the temperature of the power assist motor 82 and the ambient temperature.

Then, an estimation expression considering the difference between the temperature of the power assist motor 82 and ambient temperature is set. In setting the estimation expression, a heat gain coefficient and a heat loss coefficient are set so that temperature simulated every time exceeds the measured temperature TB in the result of the temperature simulation based upon the cumulative value TS, that is, to be the line TS shown in FIG. 7. The estimation expression is as follows.

Cumulative value $TS = \Sigma((\text{heat gain coefficient } Kup \times \text{current } I \times I) - (\text{heat loss coefficient } Kdn \times (\text{last accumulated temperature } Td - \text{ambient temperature } Tm))) + \text{initial temperature } T0$—(Expression 3). Initial temperature T0 and ambient temperature Tm are default values and it is desirable that both are set to be larger than an estimated maximum value of motor ambient temperature.

Figure 1:
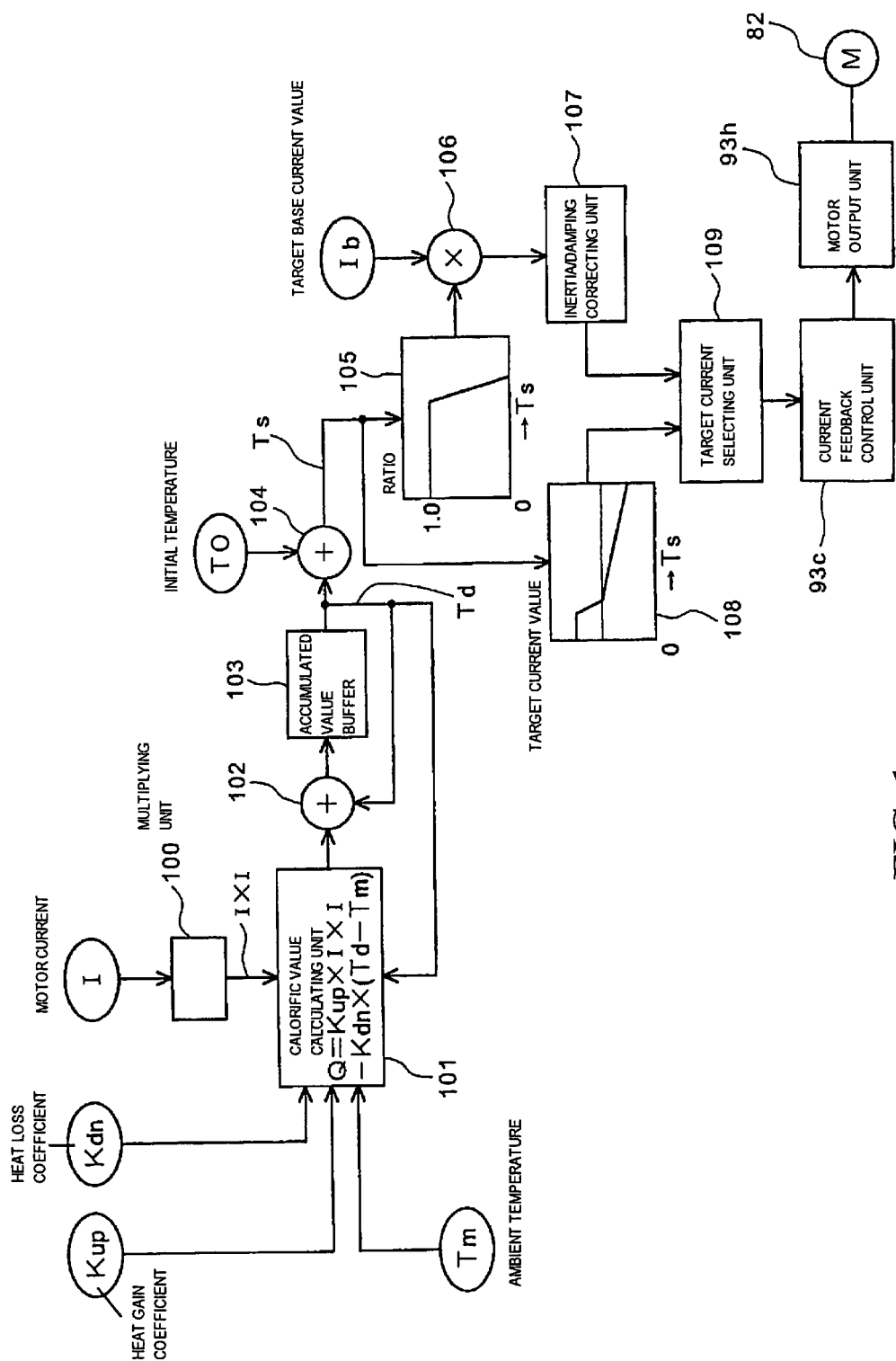
FIG. 1 is a block diagram showing facilities of a main part of a target current limiting unit in a control unit for electric power steering in one embodiment of the invention.

FIG. 1 is a block diagram showing facilities of a main part of the target current limiting unit 93b. A current value I sensed by the current sensor 93a is squared in a multiplying unit 100. A squared value of the current value I is input to a calorific value calculating unit 101 together with the heat gain coefficient Kup and the heat loss coefficient Kdn. Ambient temperature Tm is also input to the calorific value calculating unit 101 and a calorific value Q is calculated according to the following expression 4. Calorific value $Q = Kup \times I \times I - Kdn \times (Td - Tm)$—(Expression 4). The calorific value Q is accumulated in an adding unit 102 and the accumulated calorific value is input to an accumulated value buffer 103. A cumulative value $\Sigma Q$ of the calorific value Q is fed back to the calorific value calculating unit 101 as accumulated temperature Td. The accumulated temperature Td is input to an adding unit 104, is added to initial temperature T0, and a cumulative value TS is output.

A target current value supplied to the power assist motor 82 is determined according to the cumulative value TS. First, the cumulative value TS is input to a ratio map 105 and current ratio, that is, the current limited ratio is determined. Ratio set in the ratio map 105 is '1.0' until the cumulative value TS reaches a predetermined value and is '0' when the cumulative value exceeds the predetermined value. A multiplying unit 106 multiplies the ratio by a target base current value Ib. When the ratio is equal to or smaller than 1.0, a current value is limited. A target current value output from the multiplying unit 106, that is, a current value limited based upon a target current upper limit value is further corrected in an inertia/damping correcting unit 107 and is output.

In the meantime, the cumulative value TS is also input to a current upper limit map 108. The current upper limit map 108 stores target current values according to the cumulative value TS. A current value is set so that as the cumulative value TS is larger, the current value is smaller. A rate of the variation of a current value is different between an area where the cumulative value TS is small and an area where the cumulative value TS is large, and in the area where the cumulative value TS is large, a rate of the decrease of the current value is smaller than a rate of the increase of the cumulative value TS.

A target current selecting unit 109 compares a current value read from the current upper limit map 108 and a current value output from the inertia/damping correcting unit 107. The smaller current value is adopted as a target current value of the power assist motor 82 and is input to the current feedback control unit 93c.

Next, a transformed example of the method of estimating the temperature of the power assist motor 82 will be described. In the above-mentioned embodiment, the ambient temperature Tm is a fixed value. However, when space in which heat is easily confined, that is, a space in which heat mass is large is supposed, it is inconvenient that the ambient temperature Tm is the fixed value. Then, in this transformed example, the ambient temperature Tm is acquired in an expression 5.

Ambient temperature Tm=Σ((heat gain coefficient Kup2×current I×current I)−(heat loss coefficient Kdn2×(last ambient temperature Tm−ambient temperature Tm0)))+initial temperature T0—(Expression 5). This expression 5 is similar to the expression 3 though the coefficients are different.

When heat mass is small, that is, when the circumference of the power assist motor 82 is relatively an open space, the ambient temperature Tm can be calculated to be approximate in the following expression 6. Ambient temperature Tm=Σ((heat gain coefficient Kup2×current I×current I−a)—(Expression 6). The expression 6 is a simple expression using the quantity of heat radiation as a constant "a."

It has only to be determined according to a situation of space surrounding the power assist motor 82 (large or small, or whether many heating components are arranged in a circumference of the power assist motor or not) which of the expression 5 and the expression 6 is to be used as an expression for calculating the ambient temperature Tm.

According to the above-mentioned embodiments, the temperature of the power assist motor is estimated without using a temperature sensor and overheating can be prevented. That is, in the above-mentioned method of correcting the target base current value based upon ratio read from the ratio map 105, current is limited according to the cumulative value TS. However, as the cumulative value TS decreases when current is limited, the ratio increases according to the ratio map 105, current limiting is loosened, and current increases. Then, as the cumulative value TS increases again, the ratio decreases and current is reduced, the ratio increases. As described above, after the ratio is reduced from 1.0, limited current becomes an equilibrium condition in the vicinity of a certain current value and current cannot be limited to be equal to or smaller than the current value.

Figure 8:
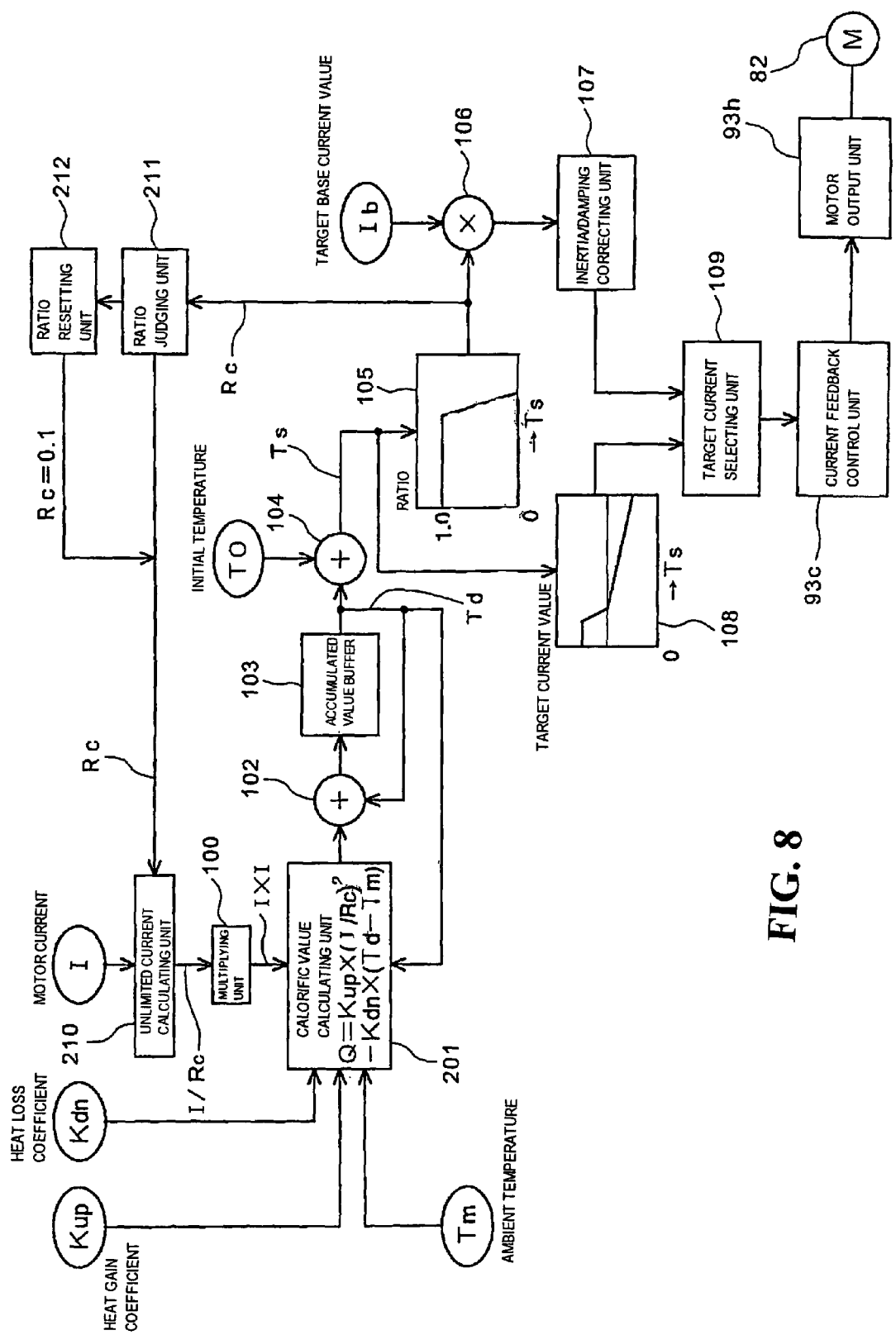
FIG. 8 is a block diagram showing facilities of a main part of a target current limiting unit in a second embodiment of the invention.

Then, the following measure is taken. FIG. 8 is a block diagram showing the facilities of a main part of a target current limiting unit in a second embodiment and the same reference numeral as that in FIG. 1 denotes the same or the similar part. An unlimited current calculating unit 210 calculates current when target current is not limited according to current ratio by dividing the present motor current I by the present ratio Rc. A calorific value calculating unit 201 is provided with an arithmetic expression acquired by replacing "I" in the expression 4 with "I/Rc", receives a heat gain coefficient Kup, a heat loss coefficient Kdn, ambient temperature Tm, a current value I/Rc and accumulated temperature Td fed back from an accumulated value buffer 103, calculates a calorific value Q, and outputs it to an adding unit 102. The output of the accumulated value buffer 103, that is, accumulated temperature Td is input to an adding unit 104, is added to initial temperature T0, and a cumulative value TS is output. As described above, the cumulative value TS calculated based upon the current I/Rc when current is not limited continues to increase without decreasing even if ratio decreases. Therefore, the ratio is reduced corresponding to this and the target current is limited.

A ratio judging unit 211 judges whether the present ratio is equal to or smaller than a predetermined value (zero or predetermined lower limit ratio) or not. When the present ratio is not equal to or smaller than the predetermined value, the present ratio Rc is input to the unlimited current calculating unit 210. When the present ratio is smaller than the predetermined value, a ratio resetting unit 212 is energized. The ratio resetting unit 212 inputs '1.0' as the ratio Rc to the unlimited current calculating unit 210. A problem that current I is divided by ratio Rc=0 is prevented by resetting the ratio and the increase of the cumulative value TS in a condition in which the current is sufficiently limited can be prevented.

When a condition in which current is limited continues for a long period of time, a problem may occur that the cumulative value TS excessively increases, it takes too long for the cumulative value to decrease after the operation of a handlebar is stopped and restoration from a current limited condition to a normal condition is delayed. The restoration from the current limited condition to the normal condition in a suitable period of time is enabled by resetting the ratio Rc to be '1'.

The unlimited current calculating unit 210 divides the present motor current by the present ratio and calculates a current value for calculating a calorific value, however, the unlimited current calculating unit has only to be configured so that an actual current value is corrected to be slightly higher using the ratio.

In the above-mentioned embodiments, the examples that the invention is applied to the power steering system are described, however, the motor protection system according to the invention can be widely applied to not only the protection of the motor for the power steering system but the system which is provided with the units for accumulating difference between a calorific value and the quantity of heat radiation and estimating the temperature of the motor and which protects the power steering system from the overheating of the motor based upon estimated temperature.

In addition, according to an embodiment of the invention, not only the motor is protected from overheating but the motor driver can be protected from overheating by limiting an upper limit value of current when current supplied to the motor is determined based upon an on-duty instructed value of the motor driver.

Figure 10:
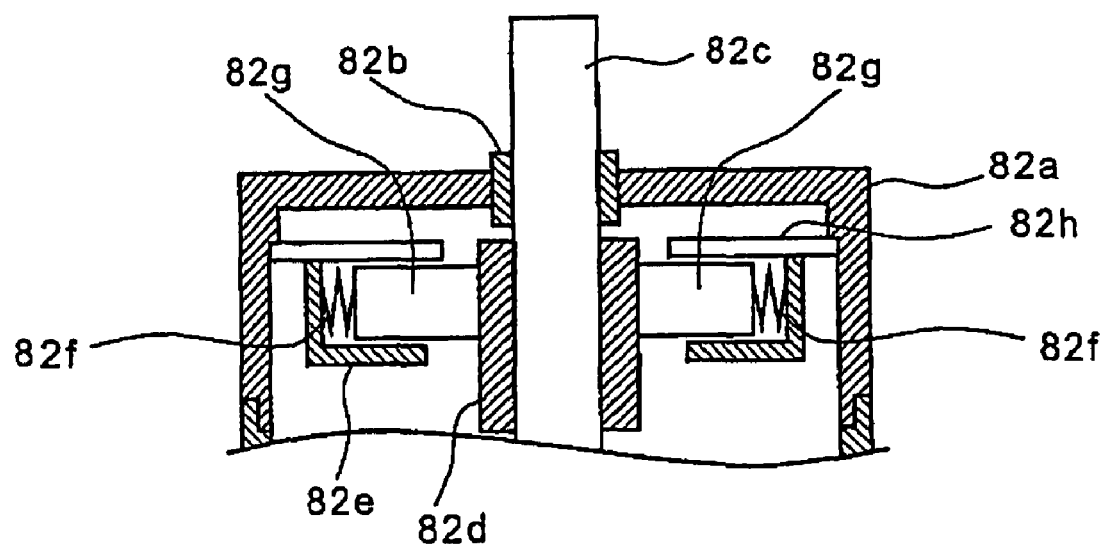
FIG. 10 is a sectional view showing the side of a power assist motor.
Figure 11:
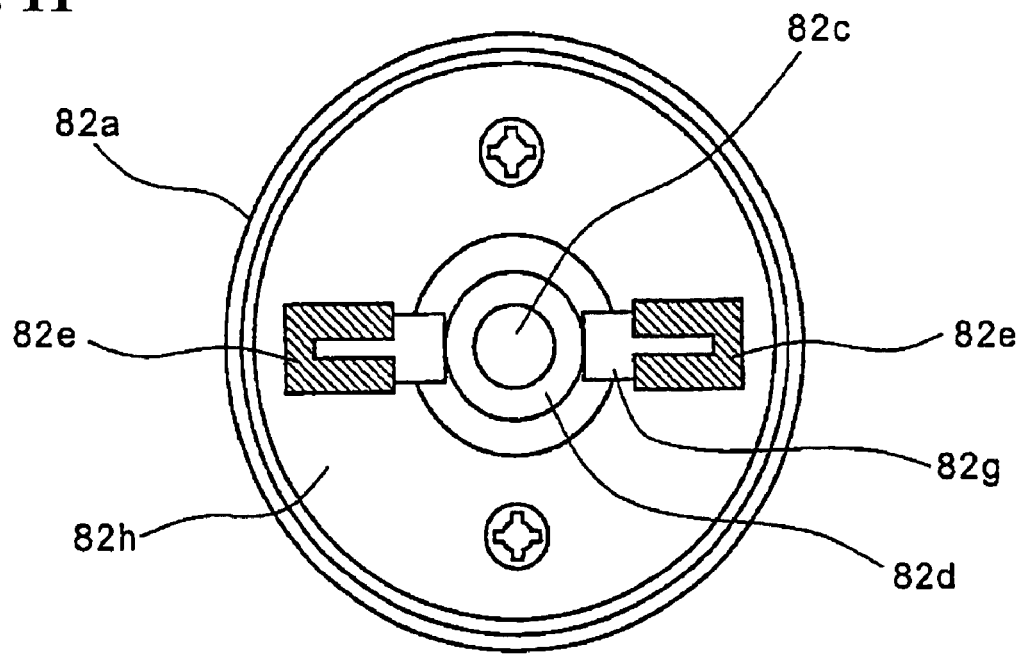
FIG. 11 is a sectional view showing the front of the power assist motor.

FIG. 10 is a sectional view showing the side of a main part of the power assist motor 82 and FIG. 11 is a sectional view showing the front of the power assist motor 82. The power assist motor 82 is provided with a housing 82a, a motor shaft 82c turnably supported by a bearing 82b inserted into the housing 82a, a commutator 82d attached onto the motor shaft 82c and each brush 82g held in a brush holder 82e and pressed by a spring 82f so that the brush abuts on the periphery of the commutator 82d. The brush holder 82e is attached to the housing 82a via an insulating plate 82h.

Figure 12:
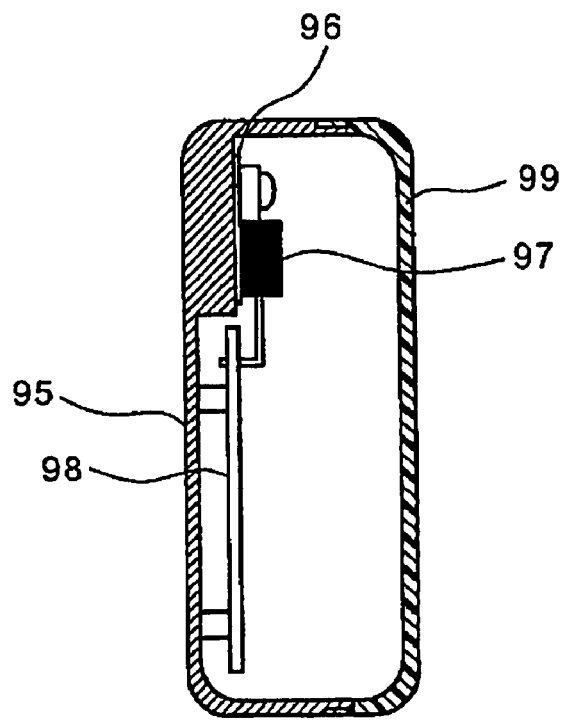
FIG. 12 is a sectional view showing a motor controller.
Figure 13:
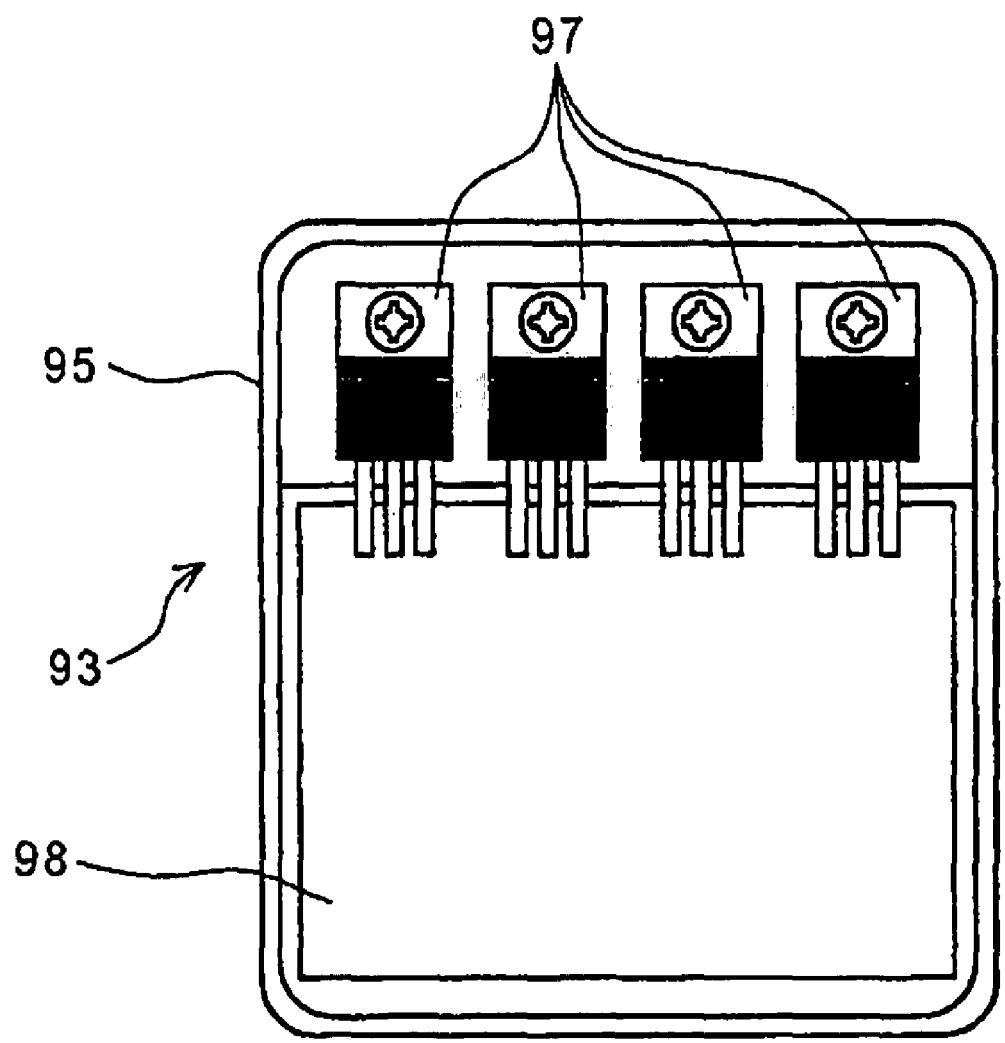
FIG. 13 is a front view showing the inside of the motor controller.

FIG. 12 is a sectional view showing the control unit (the motor controller) for electric power steering and FIG. 13 is a plan view showing the control unit 93 in a condition in which its lid is removed. The control unit 93 is configured by an aluminum die-cast case 95 with four FETs 97 as a switching device arranged in the case 95 via an insulating sheet 96. A board 98 is provided on which the FETs 97 are attached. A lid 99 is made of resin and fitted to the case 95. The FET 97 is bounded to the aluminum case 95 satisfactory in heat conduction so that heat capacity increases.

As illustrated in FIG. 5, the target base current value is input to a target current limiting unit 93b. A current sensor 93a that senses current supplied to the power assist motor 82 is provided and a current value sensed by the current sensor 93a is input to the target current limiting unit 93b and a current feedback control unit 93c.

As illustrated in FIG. 5, the target current limiting unit 93b determines the ratio of limiting current supplied to the power assist motor 82 so as to protect the power assist motor 82 and a motor output unit 93h from overheating, and calculates a target current value limited based upon the ratio and the target base current value. More specifically, the target current limiting unit calculates the temperature of the brush of the power assist motor 82 and the temperature of FET forming a switching circuit of the motor output unit 93h based upon current supplied to the power assist motor 82 and calculates the target current value according to the temperatures. The target current limiting unit 93b and arithmetic expressions used for estimating the temperature will be further described later.

As described above, with respect to FIG. 5, as the power assist motor 82 is driven and controlled based upon not only a steering torque detection signal from the torque sensor 91 but an absolute steering angle of the steering shaft 25, fine control such as steering assist force can be varied between a case wherein the handlebar 24 is turned from a position in which the vehicle directly advances and a case that the handlebar 24 is returned to the position in which the vehicle directly advances is enabled. Current supplied to the power assist motor 82 is limited depending upon the estimated temperature of the power assist motor 82 and the motor controller 93, and the power assist motor 82 and the motor controller 93 (particularly the FETs 97) which is a peripheral component of the power assist motor 82 are protected from overheating by reducing or zeroing steering assist force when the estimated temperature exceeds predetermined overheating protection temperature.

A method of estimating the temperature of the power assist motor 82 and the motor controller 93 executed in the target current limiting unit 93b will be described below in comparison with the related art. In the past, overheating protection was performed based upon the temperature of a power assist motor. In this embodiment, the temperature of the motor controller in which the same current as current flowing in the power assist motor flows is also estimated, motor current is limited according to higher estimated temperature of both, and the power assist motor and the motor controller are protected from overheating.

Figure 14A:
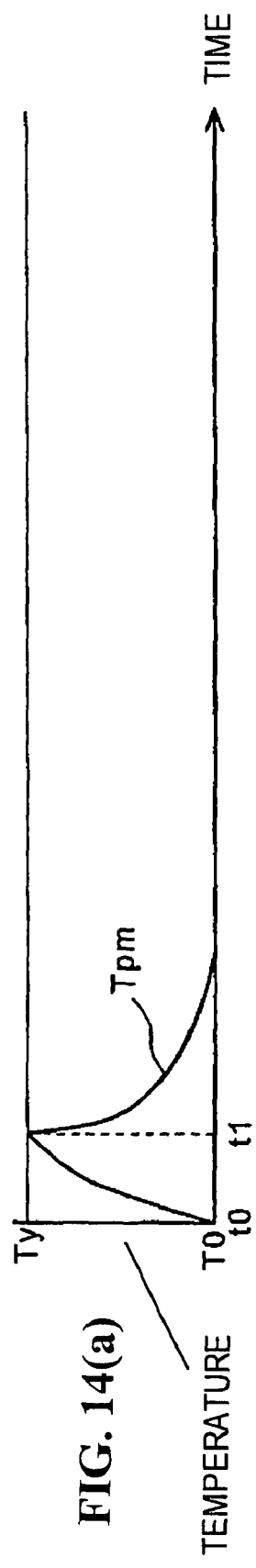
FIGS. 14(a) and 14(b) show heat gain/heat loss characteristics of components included in a power steering system.
Figure 14B:
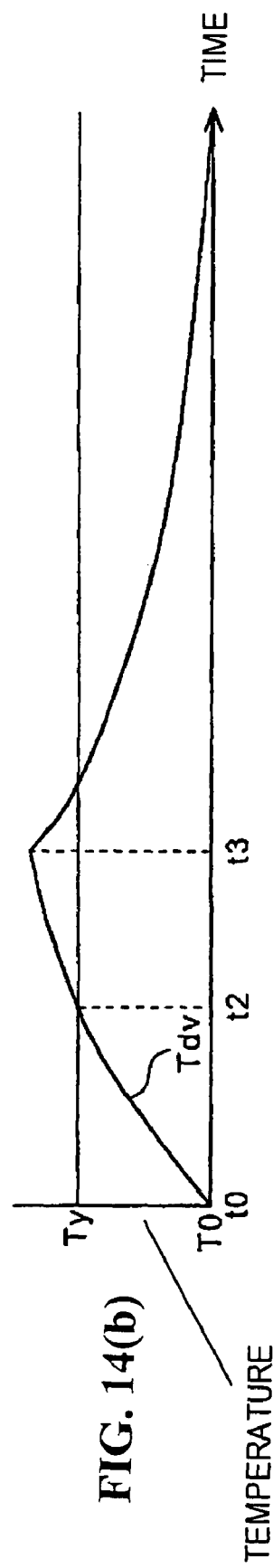

Then, the correction of the expression 2 was examined so that a calculated value could represent the actual temperature of the power assist motor 82. First, heat generation/heat radiation characteristics of the power assist motor 82 and the motor controller 93 will be described. FIGS. 14(a) and 14(b) show the heat generation/heat radiation characteristics of the power assist motor 82 and the motor controller 93. The temperature of the power assist motor 82 is represented by the temperature of the brush of the motor and the temperature of the motor controller 93 is represented by the temperature of its FETs 97.

As shown in FIG. 14(a), when the supply of electricity to the power assist motor 82 is started at time t0, the temperature Tpm of the brush rapidly rises because the brush has only a small heat capacity and reaches heat resistant temperature Ty at time t1. When the supply of electricity is stopped at the time t1 at which the temperature Tpm of the brush reaches the heat resistant temperature Ty, the temperature Tpm of the brush rapidly goes down.

In addition, as the FET bridge circuit mounted on a heat sink such as the aluminum die-cast case 95 requires a large heat capacity, the temperature Tdv slowly rises differently from the brush of the power assist motor 82 when the supply of electricity is started at time t0 as shown in FIG. 14(b) and reaches heat resistant temperature at time t2. Then, the supply of electricity is stopped at the time t2 for protection from overheating. However, the temperature Tdv further continues to rise over the heat resistant temperature Ty because of the large heat capacity, and finally slowly goes down at time t3.

As electricity is supplied to the power assist motor 82 and the FETs 97 of the motor controller 93 and the supply of electricity to them is stopped at the same timing, the temperature varies as follows. FIGS. 15(a) and 15(b) show the variation of the temperature of the power assist motor 82 and the motor controller 93 when the supply of electricity is started and stopped at the same timing. When the temperature Tpm of the power assist motor 82 reaches heat resistant temperature Ty at time t1 as shown in FIG. 15(a), the supply of electricity is stopped and when the temperature Tpm goes down to an initial temperature T0 at time t4, the supply of electricity is started.

When electricity is supplied to the motor controller 93 at the same timing as the timing of the energization, the temperature Tdv of the motor controller 93 varies as shown in FIG. 15(b). As a degree of a decline of the temperature of the motor controller 93 that requires a large heat capacity while the supply of electricity is stopped is smaller than a degree of the rise of the temperature while electricity is supplied as shown in FIG. 15b at the time of the same timing as the timing of energization of the power assist motor 82 that requires only a small heat capacity, the temperature of the motor controller 93 cannot be suitably controlled differently from a case of the power assist motor 82. Therefore, the temperature Tdv presently exceeds heat resistant temperature at time t5 and the supply of electricity is stopped for protection from overheating at the time t5.

Figure 16:
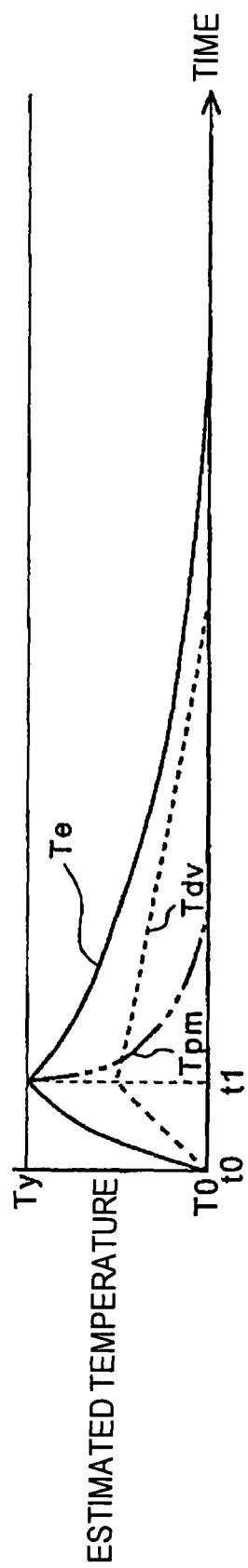
FIG. 16 shows the variation of estimated temperature calculated according to a common arithmetic expression.

FIG. 16 shows a case wherein temperature is estimated in the combination of a rapid temperature rise and a slow temperature decline in view of this characteristic. When the temperature Tpm of the power assist motor 82 and the temperature Tdy of the motor controller 93 are overlapped with estimated temperature Te as shown in FIG. 16, the estimated temperature Te surpasses both the measured temperature Tpm and the temperature Tdv and the stop and the reduction of the supply of current only have to be controlled according to the estimated temperature Te so that the estimated temperature Te does not exceed heat resistant temperature Ty. However, the estimated temperature Te returns to initial temperature T0 rather later than the time required for the actual temperatures Tpm and Tdv of the power assist motor 82 and the motor controller 93 to go down to the initial temperature T0. Therefore, this case may be unable to correspond to a situation in which a power steering operation is frequently performed.

Figure 17:
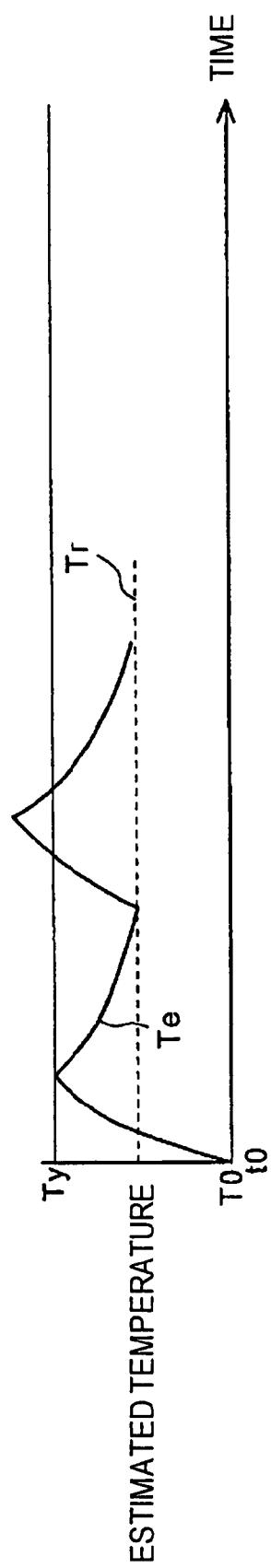
FIG. 17 shows the variation of estimated temperature when the components are intermittently energized.

It is conceivable that a frequent power steering operation is enabled by restarting the supply of electricity when the estimated temperature Te goes down to a reference temperature set to be higher than the initial temperature T0. However, in that case, the following problem occurs. FIG. 17 shows that when estimated temperature Te goes down to reference temperature Tr higher than initial temperature T0, the supply of electricity is restarted. As shown in FIG. 17, as the supply of electricity is restarted from the reference temperature Tr set to be higher than the initial temperature T0, a power steering operation is enabled in a short period of time, while the estimated temperature Te exceeds heat resistant temperature Ty in a short period of time, and current is limited again. More specifically, after current is limited, a power steering operation is enabled in a short period of time, however, the time until current is limited again is also shortened.

As described above, it is supposed that a case of single estimated temperature has a problem. Then, in the following embodiment, estimated temperature is calculated for every component (in this case, the power assist motor 82 and the motor controller 93), a smaller one of target current values determined according to the estimated temperatures is selected, and current supplied to the power assist motor 82 and the motor controller 93 is determined.

As the constant "a" is merely reduced in every calculation independent of the difference between the temperature of the power assist motor 82 and ambient temperature in the result of temperature simulation by the expression 2, estimated temperature Te linearly goes down.

In this embodiment, an estimating expression in consideration of the difference between the temperature of the power assist motor 82 and the motor controller 93 and their ambient temperature is set. In setting the estimating expression, a heat gain coefficient and a heat loss coefficient are set so that estimated temperature Te surpasses measured temperature. The estimating expression is as follows.

Cumulative value TS=Σ((heat gain coefficient Kup×current I×I)−(heat loss coefficient Kdn×(last accumulated temperature Td−ambient temperature Tm)))+initial temperature T0—(Expression 3). The initial temperature T0 and the ambient temperature Tm are default values and it is desirable that both are set to be higher than a maximum value of the estimated ambient temperature of the power assist motor 82 and the motor controller 93.

Figure 9:
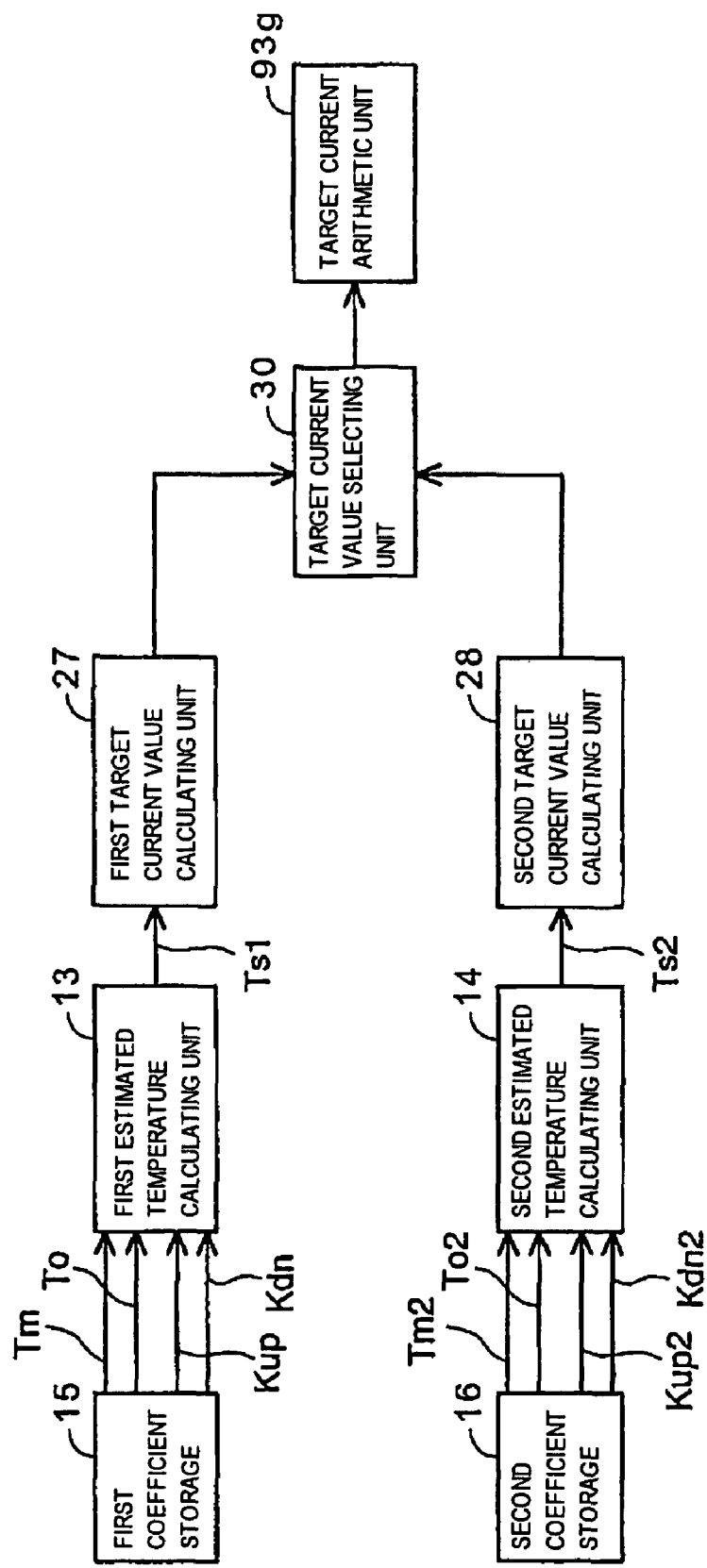
FIG. 9 is a block diagram showing facilities of a main part of a target current limiting unit in a control unit for electric power steering equivalent to one embodiment of the invention.

FIG. 9 is a block diagram showing the facilities of a main part of the target current limiting unit 93b. In a first coefficient storage 15, a heat gain coefficient Kup and a heat loss coefficient Kdn, initial temperature T0 and ambient temperature Tm of the power assist motor 82 are stored as correction coefficients beforehand. In a second coefficient storage 16, a heat gain coefficient Kup2, a heat loss coefficient Kdn2, initial temperature T02 and ambient temperature Tm2 of the motor controller 93 are stored as correction coefficients beforehand.

A first estimated temperature calculating unit 13 calculates estimated temperature TS1 of the power assist motor 82 based upon motor current I and the correction coefficients input from the first coefficient storage 15 using the estimating expression 3. A second estimated temperature calculating unit 14 calculates estimated temperature TS2 of the motor controller 93 based upon motor current and the correction coefficients input from the second coefficient storage 16 using the estimating expression 3. However, Kup2, Kdn2, the temperatures T02, Tm2 are calculated as the coefficients Kup, Kdn, the temperatures T0, Tm in the estimating expression 3.

A first target current value calculating unit 27 determines a first temporary target value of motor current based upon the estimated temperature TS1 of the power assist motor 82 input from the first estimated temperature calculating unit 13. A second current limited value calculating unit 28 determines a second temporary target value of motor current based upon the estimated temperature TS2 of the motor controller 93 input from the second estimated temperature calculating unit 14.

A target current value selecting unit 30 selects a smaller one of the first temporary target value and the second temporary target value to be a target current value. When the motor current is limited according to the smaller value, both the power assist motor 82 and the motor controller 93 can be protected from overheating. The correction of inertia and damping is applied to the selected target current value in a target current arithmetic unit 93g and the corrected target current value is output.

Figure 18:
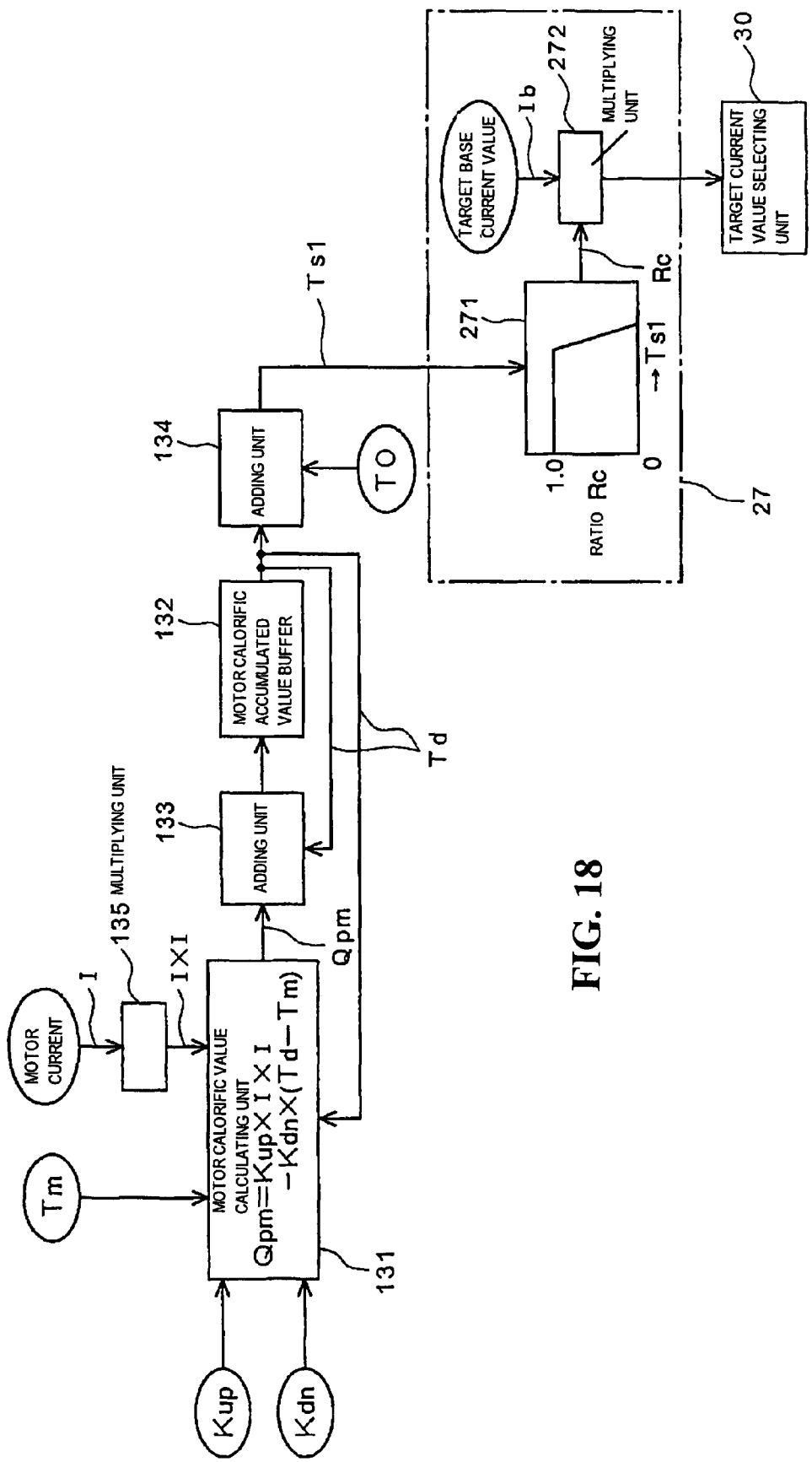
FIG. 18 is a block diagram (No. 1) showing the details of the target current limiting unit.

The target current limiting unit 93b will be described further in detail below. FIG. 18 is a block diagram (No. 1) showing the details of the target current limiting unit. The first estimated temperature calculating unit 13 is provided with a motor calorific value calculating unit 131, a motor accumulated calorific value buffer 132, adding units 133, 134 and a multiplying unit 135. The first target current value calculating unit 27 is provided with a current value ratio map 271 and a multiplying unit 272.

A current value (a motor current value) I sensed by the current sensor 93a is squared in the multiplying unit 135. A squared value of the motor current value I is input to the motor calorific value calculating unit 131 together with the heat gain coefficient Kup and the heat loss coefficient Kdn. The ambient temperature Tm of the power assist motor 82 is also input to the motor calorific value calculating unit 131 and a motor calorific value Qpm is calculated according to the following expression 4. Motor calorific value Qpm=Kup×I×I−Kdn× (Td−Tm)—(Expression 4). The motor calorific value Qpm is accumulated in the adding unit 133 and an accumulated value is input to the motor accumulated calorific value buffer 132. The cumulative value Td of the motor calorific value Qpm is fed back to the motor calorific value calculating unit 131 as accumulated temperature Td. Further, the accumulated temperature Td is input to the adding unit 134, is added to the initial temperature T0, and the cumulative value TS1 is output. A value of target current supplied to the power assist motor 82 is determined according to the cumulative value TS1.

The cumulative value TS1 is input to the ratio map 271 provided to the first target current value calculating unit 27 and current ratio, that is, current limitation ratio is determined. Ratio set in the ratio map 271 is '1.0' until the cumulative value TS1 becomes a predetermined value and when the cumulative value exceeds the predetermined value, the ratio is '0'. The multiplying unit 272 multiplies the ratio by a target base current value Ib. Therefore, when the ratio is equal to or smaller than 1.0, the target base current value Ib is limited. A target current value output from the multiplying unit 272, that is, a limited target base current value is input to the target current value selecting unit 30.

Figure 19:
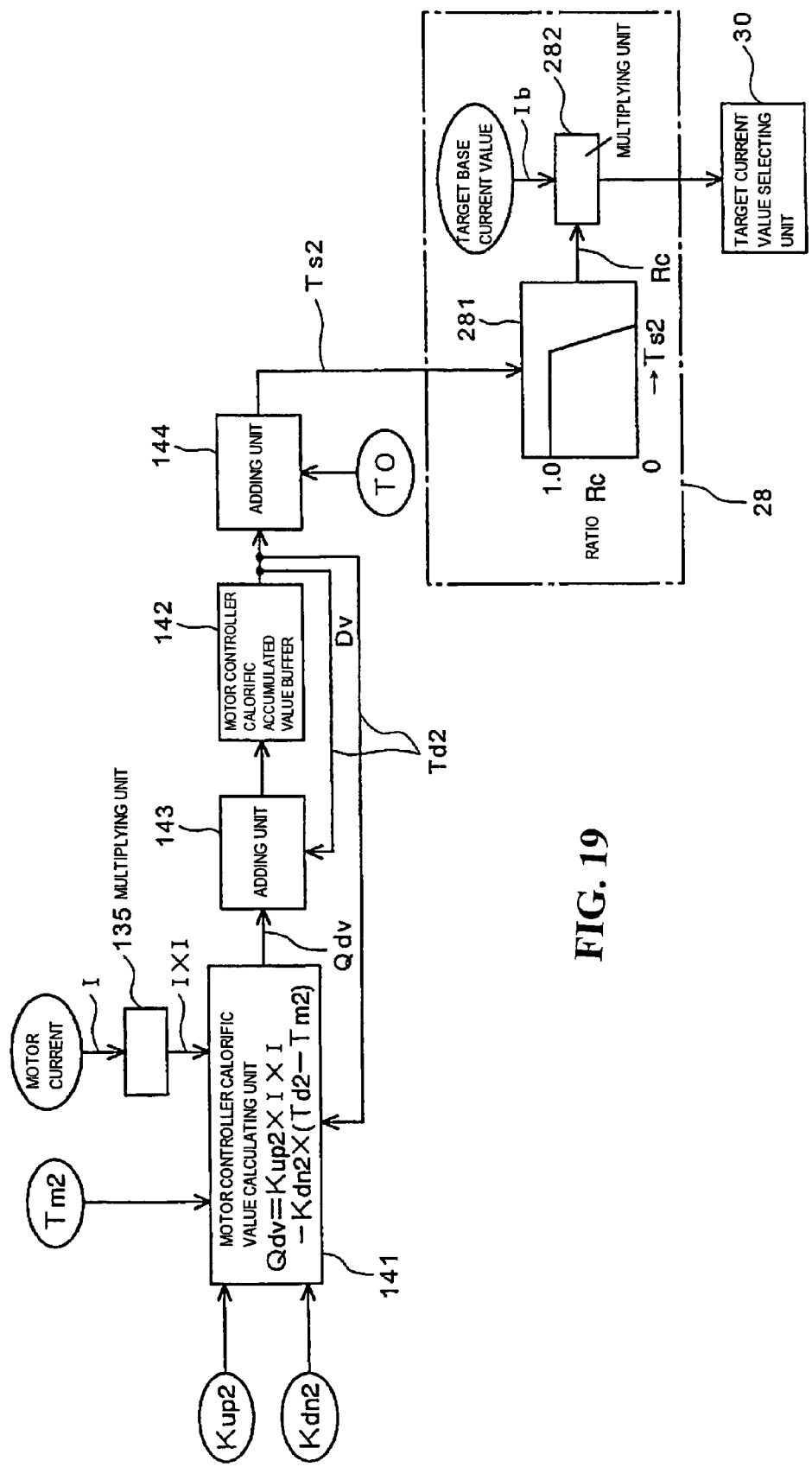
FIG. 19 is a block diagram (No. 2) showing the details of the target current limiting unit.

FIG. 19 is a block diagram showing the details of the second estimated temperature calculating unit 14. The second estimated temperature calculating unit 14 is provided with a motor controller calorific value calculating unit 141, a motor controller accumulated calorific value buffer 142, adding units 143, 144 and a multiplying unit 145. The second target current value calculating unit 28 is provided with a current value ratio map 281 and a multiplying unit 282.

A current value (a motor current value) I sensed by the current sensor 93a is squared by the multiplying unit 145. A squared value of the motor current value I is input to the motor controller calorific value calculating unit 141 together with the heat gain coefficient Kup2 and the heat loss coefficient Kdn2. The ambient temperature Tm2 of the motor controller 93 is also input to the motor controller calorific value calculating unit 141 and the motor controller calorific value Qdv is calculated according to the following expression 5. Motor calorific value $Qdv = Kup2 \times I \times I - Kdn2 \times (Td2 - Tm2)$—(Expression 5). The motor controller calorific value Qdv is accumulated by the adding unit 143 and an accumulated motor controller calorific value is input to the motor controller accumulated calorific value buffer 142. The accumulated value of the motor controller calorific values Qdv, that is, the accumulated temperature Td2 is fed back to the motor controller calorific value calculating unit 141. Further, the accumulated temperature Td2 is input to the adding unit 144, is added to the initial temperature T0 and a cumulative value TS2 is output.

As the configuration and the operation of the second target current value calculating unit 28 are the same as those of the first target current value calculating unit 27, the description is omitted.

In the above-mentioned embodiment, the ambient temperatures Tm, Tm2 are fixed values. However, in the case of space from which heat does not escape, it is inconvenient that the ambient temperatures Tm, Tm2 are fixed values. Then, the ambient temperatures Tm, Tm2 are calculated considering that heat does not escape. An expression for calculating the ambient temperature Tm is shown as the following expression 6 below.

Ambient temperature $Tm = \Sigma((\text{heat gain coefficient } Kmup \times \text{current } I \times \text{current } I) - (\text{heat loss coefficient } Kmdn \times (\text{last ambient temperature } Tm - \text{ambient temperature } Tm0))) + \text{initial temperature } T0$—(Expression 6). The expression 6 is similar to the expression 3 though the coefficients are different. The ambient temperature Tm2 is also calculated using this expression like the ambient temperature Tm. The heat gain coefficient Kmup and the heat loss coefficient Kmdn may be also be the same as the heat gain coefficient Kup and the heat loss coefficient Kdn.

When the heat capacity is small, that is, when the circumference of the power assist motor 82 is relatively an open space, the ambient temperature Tm can be calculated to be an approximate value in an expression 7. Ambient temperature $Tm = \Sigma((\text{heat gain coefficient } Kmup \times \text{current } I \times \text{current } I - a)$—(Expression 7). The expression 7 is a simple expression using a constant "a" for the quantity of heat radiation.

It depends upon a situation of space (large or small, or whether many exothermic components exist in the circumference or not) surrounding the power assist motor 82 and the motor controller 93 as to which of the expression 6 or the expression 7 is to be used for the expression for calculating the ambient temperature Tm.

Figure 20:
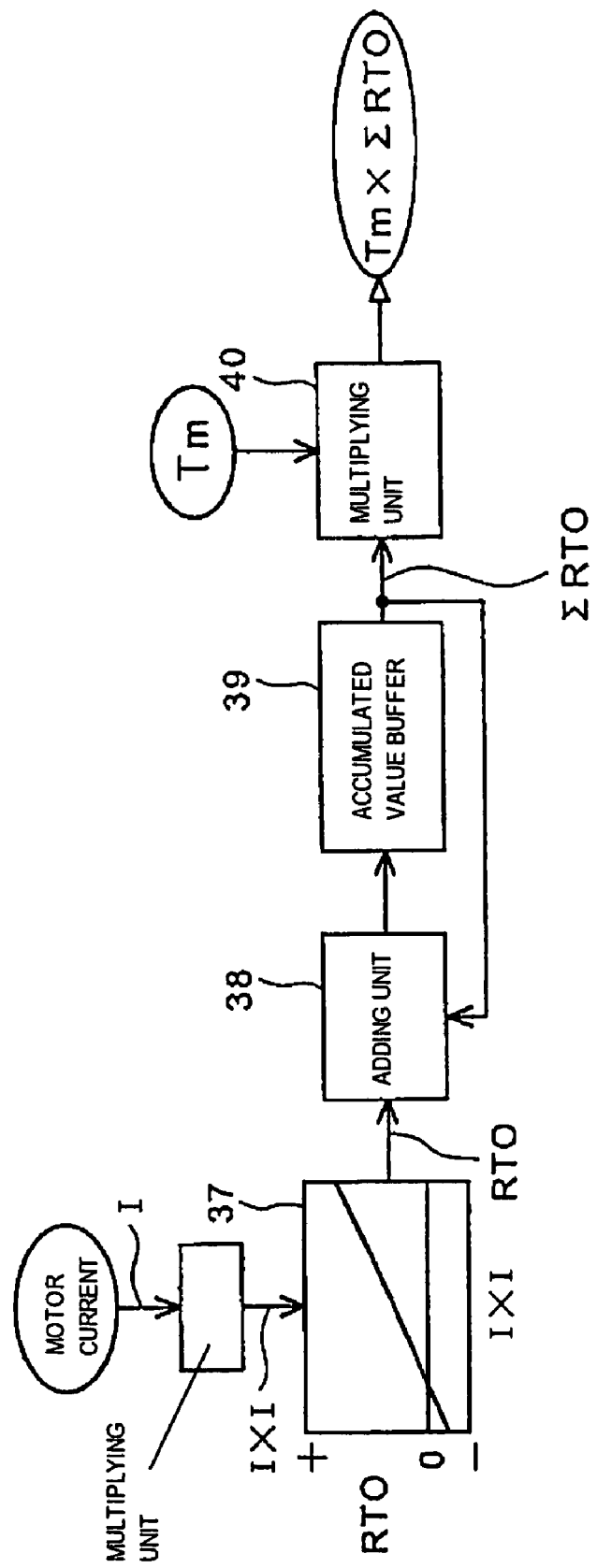
FIG. 20 is a block diagram showing facilities of a unit that corrects ambient temperature.

The heat gain coefficient Kmup and the heat loss coefficient Kmdn are fixed values and the ambient temperatures Tm, Tm2 may be also corrected as a function of the motor current I. FIG. 20 is a block diagram showing facilities of a main part for calculating the ambient temperatures Tm, Tm2 as the function of the motor current I when the heat gain coefficient Kmup and the heat loss coefficient Kmdn are fixed values. As shown in FIG. 20, an accumulating coefficient calculating unit 37 outputs an accumulating coefficient RTO as a function of "the motor current $I \times I$" and can be formed by a map. The accumulating coefficient calculating unit 37 calculates the corresponding accumulating coefficient RTO based upon the map when the motor current I is input and inputs it to an adding unit 38. The adding unit 38 adds the accumulating coefficient RTO latest input from the accumulating coefficient calculating unit 37 to a cumulative accumulating coefficient $\Sigma RTO$ accumulated in an accumulated value buffer 39. The added accumulating coefficient RTO is input to the accumulated value buffer 39 as a new cumulative accumulating coefficient $\Sigma RTO$.

The cumulative accumulating coefficient $\Sigma RTO$ accumulated in the accumulated value buffer 39 is input to a multiplying unit 40, the multiplying unit 40 multiplies the cumulative accumulating coefficient $\Sigma RTO$ by the default motor ambient temperature Tm, and corrects the motor ambient temperature Tm. The corrected motor ambient temperature Tm is supplied to the motor calorific value calculating unit 131.

The motor controller ambient temperature Tm2 is also corrected by the similar configuration to that in FIG. 20 and is supplied to the motor controller calorific value calculating unit 141.

According to the above-mentioned embodiment, the temperature of the power assist motor 82 and the motor controller 93 is estimated without using a temperature sensor, and overheating protection is enabled. More specifically, current is limited by a target current value determined based upon ratio read from the ratio maps 271 and 281. However, as the cumulative values TS1 and TS2 calculated based upon a current value decrease when current is limited, ratio increases according to the ratio maps 271 and 281 and current limitation is loosened. Then, as current increases, the cumulative values TS1 and TS2 increase again, and as the ratio decreases and current is reduced, the ratio increases again. As described above, after the ratio is reduced from 1.0 according to the cumulative values TS1, TS2, limited current varies bit by bit in the vicinity of a certain current value to be an equilibrium condition and current cannot be limited to be equal to or smaller than the current value.

Figure 21:
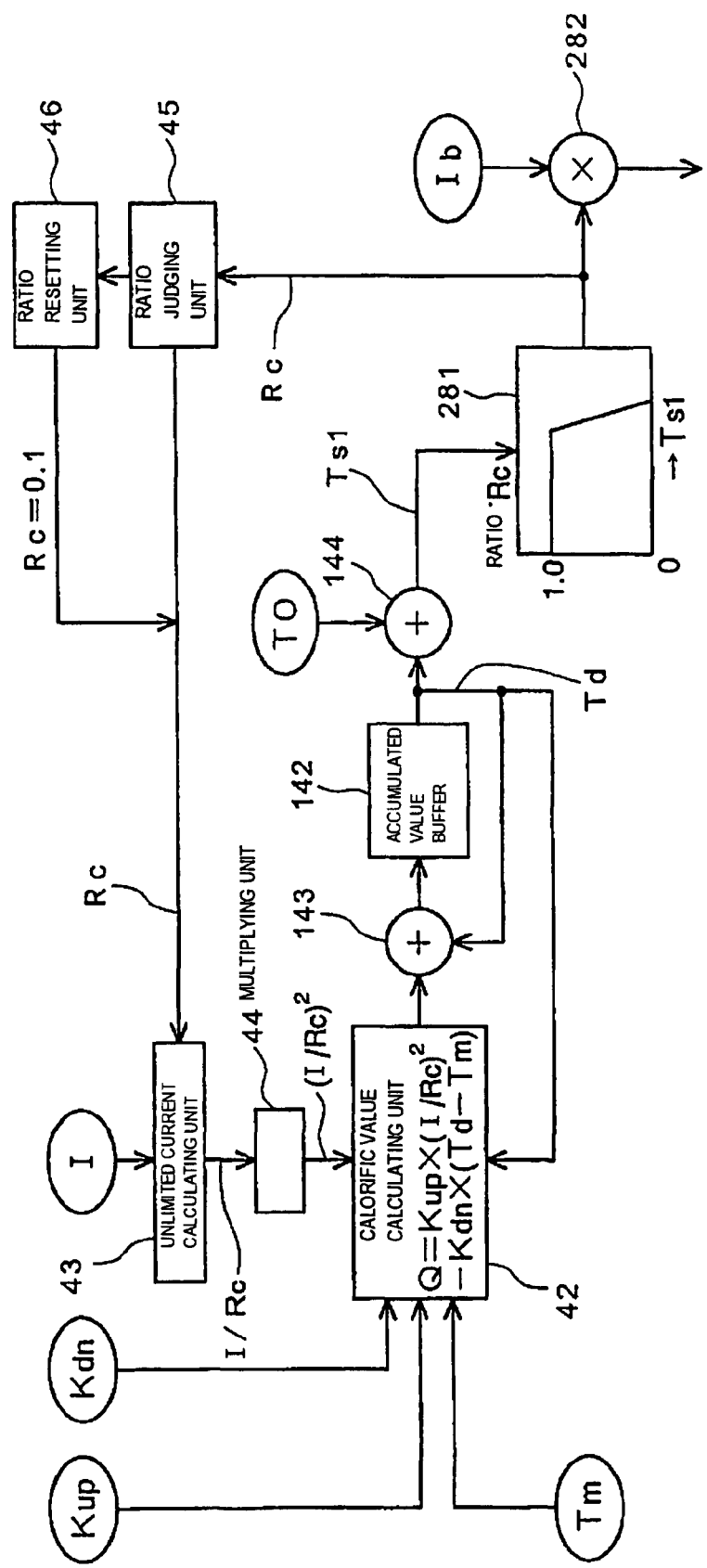
FIG. 21 is a block diagram showing the details of a target current limiting unit in a second embodiment of the invention.

To address this problem, the above-mentioned embodiment can be transformed as follows. FIG. 21 is a block diagram showing facilities of a main part of a target current limiting unit in a second embodiment and the same reference numeral as that in FIG. 9 shows the same or the similar part. A motor calorific value calculating unit 42 is similar to the motor calorific value calculating unit 131, however, the motor calorific value calculating unit is different in that a calorific value Qpm of a power assist motor 82 is calculated using the following expression 8 in place of the arithmetic expression 5. Motor calorific value $Qpm = Kup \times (I/Rc) \times (I/Rc) - Kdn \times (Td - Tm)$—(Expression 8). That is, the motor calorific value calculating unit 42 is provided with the arithmetic expression 8 in which "I" in the above-mentioned expression 4 is replaced with "I/Rc".

An unlimited current calculating unit 43 calculates current when target current is not limited by ratio of limiting current by dividing the present motor current I by the present ratio Rc. A multiplying unit 44 squares the output (I/Rc) of the unlimited current calculating unit 43 and inputs it to the motor calorific value calculating unit 42.

The motor calorific value calculating unit 42 receives a value $(I/Rc) \times (I/Rc)$ input from the multiplying unit 44, a heat gain coefficient Kup, a heat loss coefficient Kdn, ambient temperature Tm, a current value I/Rc and accumulated temperature Td fed back from an accumulated value buffer 142, calculates a calorific value Qm, and outputs it to an adding unit 143. The output of the accumulated value buffer 142, that is, the accumulated temperature Td is input to an adding unit 144, is added to initial temperature T0 there, and a cumulative value TSm is output. As described above, the cumulative value TSm calculated based upon current I/Rc when no limitation is made continues to rise without going down even if the ratio decreases. Therefore, the ratio decreases correspondingly to this and the target current is limited.

A ratio judging unit 45 judges whether the present ratio is equal to or smaller than a predetermined value (zero or predetermined lower limit ratio) or not. When the present ratio is not equal to or not smaller than the predetermined value, the present ratio Rc is input to the unlimited current calculating unit 43. When the present ratio is equal to the predetermined value, a ratio resetting unit 46 is energized. The ratio resetting unit 46 inputs '1.0' as ratio Rc to the unlimited current calculating unit 43. A problem wherein current I is divided when ratio Rc is zero is prevented by resetting the ratio. Thus, an increase of a cumulative value TS1 in a condition in which the current is sufficiently limited can be prevented.

A problem wherein a condition in which current is limited is continued for a long period of time, the cumulative value TS1 excessively increases, it takes too long to reduce the cumulative value after the operation of a handlebar is stopped. In addition, the current may be delayed to be restored from the current limited condition to a normal condition. Restoration from the current limited condition to the normal condition in a suitable period of time is enabled by resetting the ratio Rc to '1'.

The unlimited current calculating unit 43 divides the present motor current by the present ratio and calculates a current value for calculating a calorific value. However, the unlimited current value calculating unit can also correct an actual current value using the ratio to be slightly larger.

A motor controller calorific value calculating unit 141 can also be transformed in the same way as the motor calorific value calculating unit 131 is transformed to the motor calorific value calculating unit 42. However, as the motor controller calorific value calculating unit 141 can be configured similarly, the description is omitted.

As described above, concerning each of the power assist motor 82 and the motor controller 93, temperature is estimated using different arithmetic expressions, each target current value is calculated, and current is limited to a smaller one of the target current values. Therefore, individual estimated temperature acquired by calculation can be made to approximate actual temperature shown in FIG. 15, and the power assist motor 82 and the motor controller 93 can be suitably protected from overheating without applying current limitation too early and without delaying restarting energization.

In each of the above-mentioned embodiments, the heat gain coefficient, the heat loss coefficient, the ambient temperature and the initial temperature respectively different between the power assist motor 82 and the motor controller 93 are preset. However, of these, the heat gain coefficient and the heat loss coefficient which are directly influenced by heat capacity of the power assist motor 82 and the motor controller 93 are at least set dedicatedly and the others may be common coefficients. Different ratio maps may also be provided dedicatedly to estimate the temperature of the power assist motor 82 and the motor controller 93. However, a single ratio map may also be used in common.

In the above-mentioned embodiments, the case wherein the invention is applied to the electric power steering system is described. However, the protective device according to the invention is not always applied to only the power steering system. It may be provided with the unit that accumulates the difference between a calorific value and the quantity of heat radiation and estimates the temperature of the motor and the temperature of the motor controller. In addition, it may be widely applied to a system that protects the motor and the motor controller from overheating based upon estimated temperature. Further, individual temperature of not only the motor controller but a peripheral device of the motor is estimated and estimated temperature common to these can be determined.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor protection system provided with a motor, a motor driver that controls current supplied to the motor, a temperature estimating unit that estimates the temperature of the motor based upon the current supplied to the motor and an overheating prevention unit that limits an upper limit value of the current supplied to the motor according to the estimated temperature of the motor, comprising:

a current value correcting unit for correcting the limited upper limit value of the current supplied to the motor to be a larger value, wherein when the current upper limit value is limited by the overheating prevention unit, the temperature estimating unit estimates the temperature of the motor using the corrected upper limit value of the current supplied to the motor, wherein the overheating prevention unit limits the upper limit value of the current supplied to the motor at a current limiting ratio according to the temperature of the motor when the temperature estimated by the temperature estimating unit of the motor rises to a predetermined value and the current value correcting unit corrects the upper limit value to be a larger value according to the current limiting ratio, and wherein a current limiting ratio resetting unit resets the current limiting ratio to be 1.0 when the current limiting ratio is reduced to a preset value in the vicinity of zero.

2. A motor protection system provided with a motor, a motor driver that controls current supplied to the motor, a temperature estimating unit that estimates the temperature of the motor based upon the current supplied to the motor and an overheating prevention unit that limits an upper limit value of the current supplied to the motor according to the estimated temperature of the motor, comprising:

a current value correcting unit for correcting the limited upper limit value of the current supplied to the motor to be a larger value, wherein when the current upper limit value is limited by the overheating prevention unit, the temperature estimating unit estimates the temperature of the motor using the corrected upper limit value of the current supplied to the motor, wherein the overheating prevention unit limits the upper limit value of the current supplied to the motor at a current limiting ratio according to the temperature of the motor when the temperature estimated by the temperature estimating unit of the motor rises to a predetermined value and the current value correcting unit corrects the upper limit value to be a larger value according to the current limiting ratio, and the current value correcting unit corrects the upper limit value to be larger as the current limiting ratio decreases, and wherein a current limiting ratio resetting unit resets the current limiting ratio to be 1.0 when the current limiting ratio is reduced to a preset value in the vicinity of zero.

3. A motor protection system provided with a motor, a motor driver that controls current supplied to the motor, a temperature estimating unit that estimates the temperature of the motor based upon the current supplied to the motor and an overheating prevention unit that limits an upper limit value of the current supplied to the motor according to the estimated temperature of the motor, comprising:

a current value correcting unit for correcting the limited upper limit value of the current supplied to the motor to be a larger value, wherein when the current upper limit value is limited by the overheating prevention unit, the temperature estimating unit estimates the temperature of the motor using the corrected upper limit value of the current supplied to the motor, wherein the temperature estimating unit is provided with a calorific value accumulating unit that accumulates difference between a calorific value of the motor by the supplied current and the quantity of heat radiation according to time series; and the quantity of heat radiation is a function of a difference between a calorific value accumulated value calculated by the calorific value accumulating unit and ambient temperature.

4. A motor protection system provided with a motor, a motor driver that controls current supplied to the motor, a temperature estimating unit that estimates the temperature of the motor based upon the current supplied to the motor and an overheating prevention unit that limits an upper limit value of the current supplied to the motor according to the estimated temperature of the motor, comprising:

a current value correcting unit for correcting the limited upper limit value of the current supplied to the motor to be a larger value, wherein when the current upper limit value is limited by the overheating prevention unit, the temperature estimating unit estimates the temperature of the motor using the corrected upper limit value of the current supplied to the motor, wherein the overheating prevention unit limits the upper limit value of the current supplied to the motor at a current limiting ratio according to the temperature of the motor when the temperature estimated by the temperature estimating unit of the motor rises to a predetermined value and the current value correcting unit corrects the upper limit value to be a larger value according to the current limiting ratio, and wherein the temperature estimating unit is provided with a calorific value accumulating unit that accumulates difference between a calorific value of the motor by the supplied current and the quantity of heat radiation according to time series, and the quantity of heat radiation is a function of a difference between a calorific value accumulated value calculated by the calorific value accumulating unit and ambient temperature.

5. A motor protection system provided with a motor, a motor driver that controls current supplied to the motor, a temperature estimating unit that estimates the temperature of the motor based upon the current supplied to the motor and an overheating prevention unit that limits an upper limit value of the current supplied to the motor according to the estimated temperature of the motor, comprising:

a current value correcting unit for correcting the limited upper limit value of the current supplied to the motor to be a larger value, wherein when the current upper limit value is limited by the overheating prevention unit, the temperature estimating unit estimates the temperature of the motor using the corrected upper limit value of the current supplied to the motor, wherein the overheating prevention unit limits the upper limit value of the current supplied to the motor at a current limiting ratio according to the temperature of the motor when the temperature estimated by the temperature estimating unit of the motor rises to a predetermined value and the current value correcting unit corrects the upper limit value to be a larger value according to the current limiting ratio, and wherein the current value correcting unit corrects the upper limit value to be larger as the current limiting ratio decreases, wherein the temperature estimating unit is provided with a calorific value accumulating unit that accumulates difference between a calorific value of the motor by the supplied current and the quantity of heat radiation according to time series, and the quantity of heat radiation is a function of a difference between a calorific value accumulated value calculated by the calorific value accumulating unit and ambient temperature.

6. A motor protection system provided with a motor, a motor driver that controls current supplied to the motor, a temperature estimating unit that estimates the temperature of the motor based upon the current supplied to the motor and an overheating prevention unit that limits an upper limit value of the current supplied to the motor according to the estimated temperature of the motor, comprising:

a current value correcting unit for correcting the limited upper limit value of the current supplied to the motor to be a larger value, wherein when the current upper limit value is limited by the overheating prevention unit, the temperature estimating unit estimates the temperature of the motor using the corrected upper limit value of the current supplied to the motor, wherein the overheating prevention unit limits the upper limit value of the current supplied to the motor at a current limiting ratio according to the temperature of the motor when the temperature estimated by the temperature estimating unit of the motor rises to a predetermined value, and the current value correcting unit corrects the upper limit value to be a larger value according to the current limiting ratio, wherein a current limiting ratio resetting unit resets the current limiting ratio to be 1.0 when the current limiting ratio is reduced to a preset value in the vicinity of zero, wherein the temperature estimating unit is provided with a calorific value accumulating unit that accumulates difference between a calorific value of the motor by the supplied current and the quantity of heat radiation according to time series, and the quantity of heat radiation is a function of a difference between a calorific value accumulated value calculated by the calorific value accumulating unit and ambient temperature.

7. A motor protection system provided with a motor, a motor driver that controls current supplied to the motor, a temperature estimating unit that estimates the temperature of the motor based upon the current supplied to the motor and an overheating prevention unit that limits an upper limit value of the current supplied to the motor according to the estimated temperature of the motor, comprising:

- a current value correcting unit for correcting the limited upper limit value of the current supplied to the motor to be a larger value,
- wherein when the current upper limit value is limited by the overheating prevention unit, the temperature estimating unit estimates the temperature of the motor using the corrected upper limit value of the current supplied to the motor,
- wherein the temperature estimating unit is provided with a calorific value accumulating unit that accumulates difference between a calorific value of the motor by the supplied current and the quantity of heat radiation according to time series, and
- the quantity of heat radiation is a function of a difference between a calorific value accumulated value calculated by the calorific value accumulating unit and ambient temperature;
- wherein the calorific value is calculated based upon a value acquired by multiplying the motor supplied current value and a predetermined heat gain coefficient,
- the quantity of heat radiation is calculated based upon a value acquired by multiplying difference between the calorific value accumulated value and the ambient temperature and a predetermined heat loss coefficient, and
- the heat gain coefficient and the heat loss coefficient are set so that the calorific value accumulated value is larger than the temperature of the motor measured beforehand.

8. A motor protection system provided with a motor, a motor driver that controls current supplied to the motor, a temperature estimating unit that estimates the temperature of the motor based upon the current supplied to the motor and an overheating prevention unit that limits an upper limit value of the current supplied to the motor according to the estimated temperature of the motor, comprising:

- a current value correcting unit for correcting the limited upper limit value of the current supplied to the motor to be a larger value,
- wherein when the current upper limit value is limited by the overheating prevention unit, the temperature estimating unit estimates the temperature of the motor using the corrected upper limit value of the current supplied to the motor,
- wherein the overheating prevention unit limits the upper limit value of the current supplied to the motor at a current limiting ratio according to the temperature of the motor when the temperature estimated by the temperature estimating unit of the motor rises to a predetermined value; and the current value correcting unit corrects the upper limit value to be a larger value according to the current limiting ratio,
- wherein the temperature estimating unit is provided with a calorific value accumulating unit that accumulates difference between a calorific value of the motor by the supplied current and the quantity of heat radiation according to time series, and
- the quantity of heat radiation is a function of a difference between a calorific value accumulated value calculated by the calorific value accumulating unit and ambient temperature,
- wherein the calorific value is calculated based upon a value acquired by multiplying the motor supplied current value and a predetermined heat gain coefficient,
- the quantity of heat radiation is calculated based upon a value acquired by multiplying difference between the calorific value accumulated value and the ambient temperature and a predetermined heat loss coefficient, and
- the heat gain coefficient and the heat loss coefficient are set so that the calorific value accumulated value is larger than the temperature of the motor measured beforehand.

9. A motor protection system provided with a motor, a motor driver that controls current supplied to the motor, a temperature estimating unit that estimates the temperature of the motor based upon the current supplied to the motor and an overheating prevention unit that limits an upper limit value of the current supplied to the motor according to the estimated temperature of the motor, comprising:

- a current value correcting unit for correcting the limited upper limit value of the current supplied to the motor to be a larger value,
- wherein when the current upper limit value is limited by the overheating prevention unit, the temperature estimating unit estimates the temperature of the motor using the corrected upper limit value of the current supplied to the motor,
- wherein the overheating prevention unit limits the upper limit value of the current supplied to the motor at a current limiting ratio according to the temperature of the motor when the temperature estimated by the temperature estimating unit of the motor rises to a predetermined value, and the current value correcting unit corrects the upper limit value to be a larger value according to the current limiting ratio,
- wherein the current value correcting unit corrects the upper limit value to be larger as the current limiting ratio decreases,
- wherein the temperature estimating unit is provided with a calorific value accumulating unit that accumulates difference between a calorific value of the motor by the supplied current and the quantity of heat radiation according to time series, and
- the quantity of heat radiation is a function of a difference between a calorific value accumulated value calculated by the calorific value accumulating unit and ambient temperature,
- wherein the calorific value is calculated based upon a value acquired by multiplying the motor supplied current value and a predetermined heat gain coefficient,
- the quantity of heat radiation is calculated based upon a value acquired by multiplying difference between the calorific value accumulated value and the ambient temperature and a predetermined heat loss coefficient, and
- the heat gain coefficient and the heat loss coefficient are set so that the calorific value accumulated value is larger than the temperature of the motor measured beforehand.

10. A motor protection system provided with a motor, a motor driver that controls current supplied to the motor, a temperature estimating unit that estimates the temperature of the motor based upon the current supplied to the motor and an overheating prevention unit that limits an upper limit value of the current supplied to the motor according to the estimated temperature of the motor, comprising:

- a current value correcting unit for correcting the limited upper limit value of the current supplied to the motor to be a larger value,
- wherein when the current upper limit value is limited by the overheating prevention unit, the temperature estimating unit estimates the temperature of the motor using the corrected upper limit value of the current supplied to the motor, wherein the overheating prevention unit limits the upper limit value of the current supplied to the motor at a current limiting ratio according to the temperature of the motor when the temperature estimated by the temperature estimating unit of the motor rises to a predetermined value and the current value correcting unit corrects the upper limit value to be a larger value according to the current limiting ratio, wherein a current limiting ratio resetting unit that resets the current limiting ratio to be 1.0 when the current limiting ratio is reduced to a preset value in the vicinity of zero, wherein the temperature estimating unit is provided with a calorific value accumulating unit that accumulates difference between a calorific value of the motor by the supplied current and the quantity of heat radiation according to time series, and the quantity of heat radiation is a function of a difference between a calorific value accumulated value calculated by the calorific value accumulating unit and ambient temperature, wherein the calorific value is calculated based upon a value acquired by multiplying the motor supplied current value and a predetermined heat gain coefficient, the quantity of heat radiation is calculated based upon a value acquired by multiplying difference between the calorific value accumulated value and the ambient temperature and a predetermined heat loss coefficient, and the heat gain coefficient and the heat loss coefficient are set so that the calorific value accumulated value is larger than the temperature of the motor measured beforehand.

11. A motor protection system provided with a motor, a motor driver that controls current supplied to the motor, a temperature estimating unit that estimates the temperature of the motor based upon the current supplied to the motor and an overheating prevention unit that limits an upper limit value of the current supplied to the motor according to the estimated temperature of the motor, comprising:

a current value correcting unit for correcting the limited upper limit value of the current supplied to the motor to be a larger value, wherein when the current upper limit value is limited by the overheating prevention unit, the temperature estimating unit estimates the temperature of the motor using the corrected upper limit value of the current supplied to the motor, wherein the temperature estimating unit is provided with a calorific value accumulating unit that accumulates difference between a calorific value of the motor by the supplied current and the quantity of heat radiation according to time series, and the quantity of heat radiation is a function of a difference between a calorific value accumulated value calculated by the calorific value accumulating unit and ambient temperature, wherein the calorific value is calculated based upon a value acquired by multiplying the motor supplied current value and a predetermined heat gain coefficient, the quantity of heat radiation is calculated based upon a value acquired by multiplying difference between the calorific value accumulated value and the ambient temperature and a predetermined heat loss coefficient, and the heat gain coefficient and the heat loss coefficient are set so that the calorific value accumulated value is larger than the temperature of the motor measured beforehand, wherein the calorific value is calculated based upon a value acquired by multiplying the motor supplied current value and a predetermined heat gain coefficient, the quantity of heat radiation is calculated based upon a value acquired by multiplying difference between the calorific value accumulated value and the ambient temperature and a predetermined heat loss coefficient, and the heat gain coefficient and the heat loss coefficient are set so that the calorific value accumulated value is larger than the temperature of the motor measured beforehand.

12. A motor protection system provided with a motor, a motor driver that controls current supplied to the motor, a temperature estimating unit that estimates the temperature of the motor based upon the current supplied to the motor and an overheating prevention unit that limits an upper limit value of the current supplied to the motor according to the estimated temperature of the motor, comprising:

a current value correcting unit for correcting the limited upper limit value of the current supplied to the motor to be a larger value, wherein when the current upper limit value is limited by the overheating prevention unit, the temperature estimating unit estimates the temperature of the motor using the corrected upper limit value of the current supplied to the motor and wherein the overheating prevention unit limits the upper limit value of the current supplied to the motor at a current limiting ratio according to the temperature of the motor when the temperature estimated by the temperature estimating unit of the motor rises to a predetermined value and the current value correcting unit corrects the upper limit value to be a larger value according to the current limiting ratio, and wherein a current limiting ratio resetting unit that resets the current limiting ratio to be 1.0 when the current limiting ratio is reduced to a preset value in the vicinity of zero, wherein the motor is a motor for a power steering system that applies steering assist force according to torque that acts on a steering shaft to the steering shaft, and the motor driver varies current supplied to the motor according to an amplitude of the torque and controls the steering assist force.

13. A motor protection system provided with a motor, a motor driver that controls current supplied to the motor, a temperature estimating unit that estimates the temperature of the motor based upon the current supplied to the motor and an overheating prevention unit that limits an upper limit value of the current supplied to the motor according to the estimated temperature of the motor, comprising:

a current value correcting unit for correcting the limited upper limit value of the current supplied to the motor to be a larger value, wherein when the current upper limit value is limited by the overheating prevention unit, the temperature estimating unit estimates the temperature of the motor using the corrected upper limit value of the current supplied to the motor, wherein the temperature estimating unit is provided with a calorific value accumulating unit that accumulates difference between a calorific value of the motor by the supplied current and the quantity of heat radiation according to time series, the quantity of heat radiation is a function of a difference between a calorific value accumulated value calculated by the calorific value accumulating unit and ambient temperature, wherein the motor is a motor for a power steering system that applies steering assist force according to torque that acts on a steering shaft to the steering shaft, and the motor driver varies current supplied to the motor according to an amplitude of the torque and controls the steering assist force.

14. A motor protection system provided with a motor, a motor driver that controls current supplied to the motor, a temperature estimating unit that estimates the temperature of the motor based upon the current supplied to the motor and an overheating prevention unit that limits an upper limit value of the current supplied to the motor according to the estimated temperature of the motor, comprising:

a current value correcting unit for correcting the limited upper limit value of the current supplied to the motor to be a larger value, wherein when the current upper limit value is limited by the overheating prevention unit, the temperature estimating unit estimates the temperature of the motor using the corrected upper limit value of the current supplied to the motor, wherein the temperature estimating unit is provided with a calorific value accumulating unit that accumulates difference between a calorific value of the motor by the supplied current and the quantity of heat radiation according to time series, the quantity of heat radiation is a function of a difference between a calorific value accumulated value calculated by the calorific value accumulating unit and ambient temperature, wherein the calorific value is calculated based upon a value acquired by multiplying the motor supplied current value and a predetermined heat gain coefficient, the quantity of heat radiation is calculated based upon a value acquired by multiplying difference between the calorific value accumulated value and the ambient temperature and a predetermined heat loss coefficient, the heat gain coefficient and the heat loss coefficient are set so that the calorific value accumulated value is larger than the temperature of the motor measured beforehand, wherein the motor is a motor for a power steering system that applies steering assist force according to torque that acts on a steering shaft to the steering shaft, and the motor driver varies current supplied to the motor according to an amplitude of the torque and controls the steering assist force.

* * * * *